(12) United States Patent
Shenoy et al.

(10) Patent No.: US 8,582,500 B2
(45) Date of Patent: Nov. 12, 2013

(54) METHODS FOR PROVIDING AN AD HOC MOBILE COMMUNICATION NETWORK AND SYSTEMS THEREOF

(75) Inventors: Nirmala Shenoy, West Henrietta, NY (US); Yamin S. Al-Mousa, Rochester, NY (US); John Fischer, Corfu, NY (US)

(73) Assignee: Rochester Institute of Technology, Rochester, NY (US)

( * ) Notice: Subject to any disclaimer, the term of this patent is extended or adjusted under 35 U.S.C. 154(b) by 943 days.

(21) Appl. No.: 12/435,182

(22) Filed: May 4, 2009

(65) Prior Publication Data

US 2010/0046426 A1     Feb. 25, 2010

Related U.S. Application Data

(60) Provisional application No. 61/126,292, filed on May 2, 2008, provisional application No. 61/126,228, filed on May 2, 2008.

(51) Int. Cl.
*H04W 4/00* (2009.01)

(52) U.S. Cl.
USPC ......... 370/328; 370/254; 370/395.2; 370/401

(58) Field of Classification Search
USPC .............. 370/254, 328, 338, 349, 468, 395.2, 370/401; 709/224
See application file for complete search history.

(56) References Cited

U.S. PATENT DOCUMENTS

| | | | |
|---|---|---|---|
| 5,088,091 A | 2/1992 | Schroeder et al. | |
| 5,101,480 A | 3/1992 | Shin et al. | |
| 5,138,615 A | 8/1992 | Lamport et al. | |
| 5,179,558 A | 1/1993 | Thacker et al. | |
| 5,434,850 A | 7/1995 | Fielding et al. | |
| 6,018,659 A | 1/2000 | Ayyagari et al. | |
| 6,049,593 A | 4/2000 | Acampora | |
| 6,198,921 B1 | 3/2001 | Youssefzadeh et al. | |
| 6,219,346 B1 | 4/2001 | Maxemchuk | |
| 6,246,689 B1 | 6/2001 | Shavitt | |
| 6,298,053 B1 | 10/2001 | Flammer, III et al. | |
| 6,314,163 B1 | 11/2001 | Acampora | |
| 6,363,062 B1 | 3/2002 | Aaronson et al. | |
| 6,381,227 B1 | 4/2002 | Fielding et al. | |
| 6,625,130 B2 | 9/2003 | Fielding | |
| 6,640,087 B2 | 10/2003 | Reed et al. | |
| 6,697,359 B1 | 2/2004 | George | |
| 6,704,301 B2 | 3/2004 | Chari et al. | |
| 6,711,407 B1 | 3/2004 | Cornils | |
| 6,735,393 B1 | 5/2004 | Zouganeli | |
| 6,760,778 B1 | 7/2004 | Nelson et al. | |
| 6,771,617 B1 | 8/2004 | Fielding | |
| 6,816,483 B1 | 11/2004 | Beckstrom et al. | |
| 6,829,237 B2 | 12/2004 | Carson et al. | |

(Continued)

*Primary Examiner* — Brian D Nguyen
*Assistant Examiner* — Toan Nguyen
(74) *Attorney, Agent, or Firm* — Joseph M. Noto; Bond Schoeneck & King, PLLC

(57) ABSTRACT

A method, computer readable medium, and system for providing a mobile communication network includes dynamically forming a plurality of mobile communication devices into one or more clusters based on one or more parameters, each of the one or more clusters having a tree structure. Each of the one or more clusters are at least partially meshed together. At least one virtual identifier is dynamically assigned to each of the plurality of mobile communication devices based on the tree structure of each of the one or more clusters. The virtual identifier provides address information for routing communications between two or more of the plurality of mobile communication devices.

50 Claims, 16 Drawing Sheets

(56) References Cited

U.S. PATENT DOCUMENTS

| | | |
|---|---|---|
| 6,831,921 B2 | 12/2004 | Higgins |
| 6,850,502 B1 | 2/2005 | Kagan et al. |
| 6,917,759 B2 | 7/2005 | de Boer et al. |
| 6,917,985 B2 | 7/2005 | Madruga et al. |
| 6,947,708 B2 | 9/2005 | Fattouch |
| 6,965,575 B2 | 11/2005 | Srikrishna et al. |
| 6,967,954 B2 | 11/2005 | Sugiyama |
| 6,973,269 B1 | 12/2005 | Britz et al. |
| 6,982,966 B2 | 1/2006 | Eidenschink et al. |
| 6,996,086 B2 | 2/2006 | Wolfe et al. |
| 7,012,895 B1 | 3/2006 | Mir |
| 7,016,328 B2 | 3/2006 | Chari et al. |
| 7,027,388 B2 | 4/2006 | Wen et al. |
| 7,031,293 B1 | 4/2006 | Srikrishna et al. |
| 7,042,988 B2 | 5/2006 | Juitt et al. |
| 7,058,021 B2 | 6/2006 | Srikrishna et al. |
| 7,184,421 B1 * | 2/2007 | Liu et al. ............ 370/338 |
| 8,160,096 B1 * | 4/2012 | Anburaj ............ 370/468 |
| 2005/0216585 A1 * | 9/2005 | Todorova et al. ............ 709/224 |
| 2006/0029002 A1 * | 2/2006 | Park et al. ............ 370/254 |
| 2007/0159983 A1 * | 7/2007 | Eglin et al. ............ 370/254 |
| 2008/0219237 A1 * | 9/2008 | Thubert et al. ............ 370/349 |

\* cited by examiner

METHODS FOR PROVIDING AN AD HOC MOBILE COMMUNICATION NETWORK AND SYSTEMS THEREOF

This application claims the benefit of U.S. Provisional Patent Application Ser. No. 61/126,292, filed May 2, 2008 and claims the benefit of U.S. Provisional Patent Application Ser. No. 61/126,228, filed May 2, 2008, which are hereby incorporated by reference in their entirety.

FIELD OF THE INVENTION

The present invention relates to methods and systems for providing communication networks and, more particularly, to methods for providing an ad hoc mobile communication network and systems thereof.

BACKGROUND

Mobile ad hoc networks are self-configuring networks of mobile communication devices coupled together by wireless links. In these networks, the mobile communication devices are independent devices which can move in any direction with respect to each other. As a result of these independent movements, each of these mobile communication devices often change their links to other mobile communication devices. Additionally, each of these mobile communication devices not only handle their own communications, but must act as routers and forward traffic for other mobile communication devices unrelated to their own use.

Existing mobile ad hoc networks often utilize the Open Systems Interconnection (OSI) seven layer network protocol model. The seven layers of this protocol model comprise: Application; Presentation; Session; Transport; Network; Data-Link; and Physical. These layers are established to provide services to layers which are above and below each layer. In particular, the Network layer or layer 3 performs network routing functions and routers operate at this layer.

Although operational, these existing mobile ad hoc networks face ongoing challenges which restrict their effectiveness and efficiency. For example, these networks often have issues in establishing and maintaining uninterrupted communications between mobile communication devices. Additionally, the established links or connection between mobile communication devices often are not the most effective and efficient methods for communications. Further, these networks often require the mobile communication devices to carry predetermined routing tables for routing traffic.

SUMMARY

A method for providing a mobile communication network in accordance with embodiments of the present invention includes dynamically forming a plurality of mobile communication devices into one or more clusters based on one or more parameters, each of the one or more clusters having a tree structure. Each of the one or more clusters is at least partially meshed together. At least one virtual identifier is dynamically assigned to each of the plurality of mobile communication devices based on the tree structure of each of the one or more clusters. The virtual identifier provides address information for routing communications between two or more of the plurality of mobile communication devices.

A computer readable medium in accordance with other embodiments of the present invention having stored thereon instructions a method for providing a mobile communication network comprising machine executable code which when executed by at least one processor, causes the processor to perform steps including dynamically forming a plurality of mobile communication devices into one or more clusters based on one or more parameters, each of the one or more clusters having a tree structure. Each of the one or more clusters is at least partially meshed together. At least one virtual identifier is dynamically assigned to each of the plurality of mobile communication devices based on the tree structure of each of the one or more clusters. The virtual identifier provides address information for routing communications between two or more of the plurality of mobile communication devices.

A mobile communication network system in accordance with other embodiments of the present invention includes a tree structure clustering system, a meshing system, and a virtual identification system in at least one of a plurality of mobile communication devices. The tree structure clustering system in at least one of a plurality of mobile communication devices dynamically forms the plurality of mobile communication devices into one or more clusters based on one or more parameters, each of the one or more clusters having a tree structure. The meshing system in the at least one of a plurality of mobile communication devices at least partially meshes each of the one or more clusters together. The virtual identification system in the at least one of a plurality of mobile communication devices dynamically assigns at least one virtual identifier to each of the plurality of mobile communication devices based on the tree structure of each of the one or more clusters to provide address information for routing communications between two or more of the plurality of mobile communication devices.

The present invention provides a number of advantages including providing a proactive system and method for providing a mobile communication network which leverages the advantages of a tree routing structure for easy routing with a mesh network for route robustness. The present invention utilizes a virtual identification system which facilitates easy and dynamic tree creation with very low overhead and loop aversion. This virtual identification system relieves the routing functions at layer 3 in the OSI seven layer model. Relieving these routing functions reduces overheads and delays associated with layer 3 processing and handling and makes the present invention independent of any future IP layer protocol changes, such as in Internet Protocol version 6.

BRIEF DESCRIPTION OF THE DRAWINGS

FIG. 12 is a flowchart of an example of a method for processing a request to join a cluster that a mobile communication devices is already a member of;

FIG. 13 is a flowchart of another example of a method for processing a request to join a cluster that a mobile communication devices is not already a member of;

DETAILED DESCRIPTION

Figure 1:
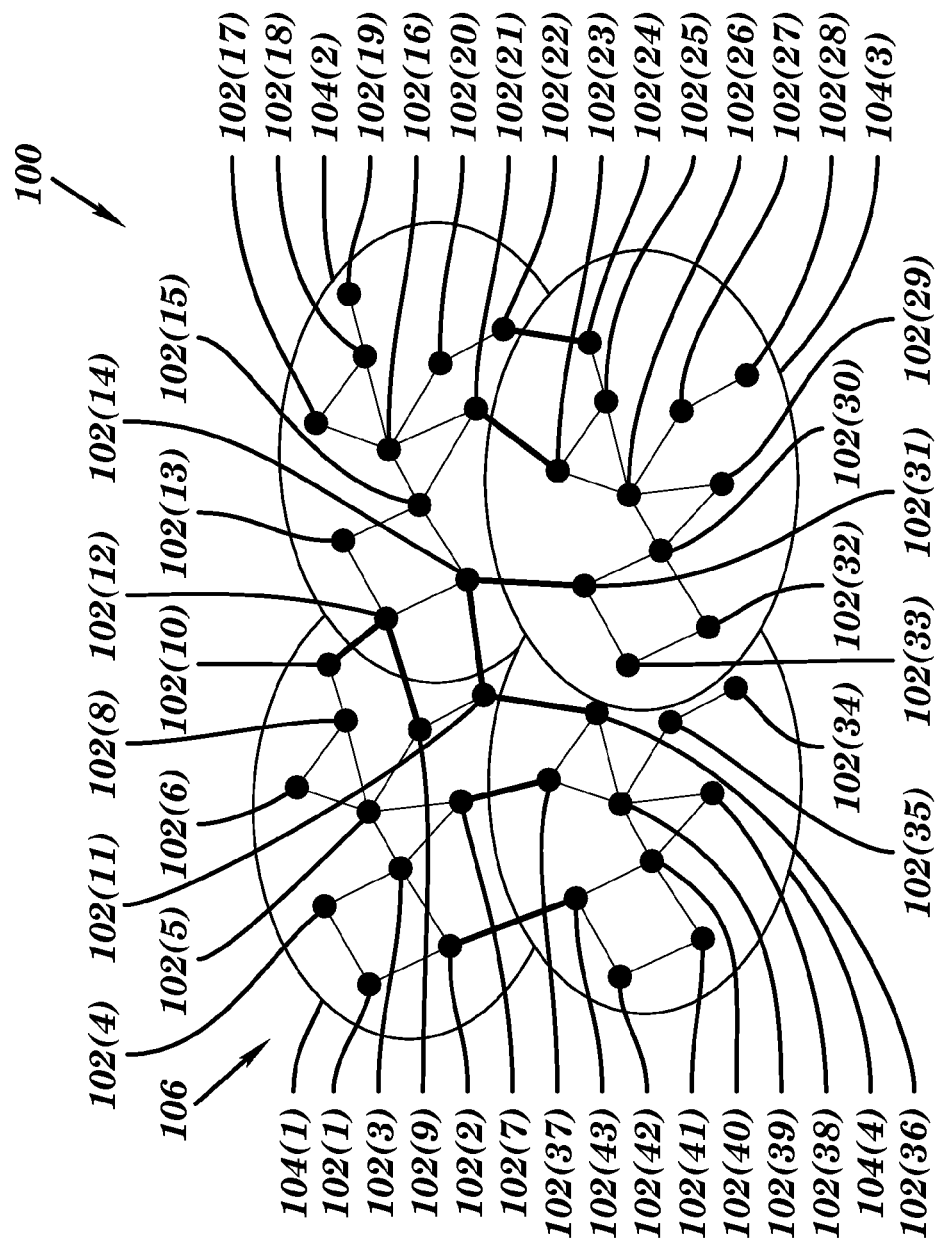
FIG. 1 is a block diagram of an example of an ad hoc mobile communication network system in accordance with embodiments of the present invention.

An ad hoc mobile communication network system 100 in accordance with embodiments of the present invention in accordance with embodiments of the present invention is illustrated in FIG. 1. The ad hoc mobile communication network system 100 includes a plurality of mobile communication devices 102(1)-102(43), also referred to as nodes or cluster clients (CCs), arranged in a plurality of clusters 104 (1)-104(4) in a region 106, although the system can include other types and numbers of systems and devices, such as one or more fixed location communication systems and devices by way of example, connected in other manners. The present invention provides a number of advantages including providing a proactive mobile communication method and system which leverages the advantages of a tree routing structure for easy routing and a mesh network for route robustness.

Referring more specifically to FIG. 1, the ad hoc mobile communication network system 100 comprises an ad-hoc network of mobile communication devices 102(1)-102(43), such as motor vehicles, aircraft or people each with a mobile communication device by way of example, although other types and numbers of communication devices and systems in other areas can be used. The mobile communication devices 102(1)-102(43) are self configuring with each other in the region 106 which in this example is defined by the outer perimeter of the clusters 104(1)-104(4), although the region could have other sizes and shapes which do not have to correspond with the outer perimeter of the clusters, for example the region can be larger than the clusters. Each of the plurality of mobile communication devices 102(1)-102(43) comprises a wireless mobile device, such as a cell phone or other personal communication devices by way of example, although other types and numbers of mobile and fixed communication devices can be used. Each of these mobile communication devices 102(1)-102(43) can engage in communications with other devices and systems and also can act as a router to forward communications between other devices and systems, although the plurality of mobile communication devices 102(1)-102(43) can perform other types and numbers of functions. Additionally, each of the mobile communication devices 102(1)-102(43) can move independently with respect to other devices and systems, although one or more of these devices and systems could have a fixed location with respect to one or more of the other devices.

The mobile communication devices 102(1)-102(43) each have a processing unit (CPU) or processor, a memory, and a communication interface system which are coupled together by a bus or other link, although other numbers and types of elements, components, parts, devices, and systems in other configurations and locations can be used. The processor in each of the mobile communication devices 102(1)-102(43) executes a program of stored instructions for one or more aspects of the present invention as described and illustrated by way of the embodiments herein, although the processor could execute other numbers and types of programmed instructions. The memory in each of the mobile communication devices 102(1)-102(43) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the mobile communication devices 102(1)-102(43). The communication interface system in each of the mobile communication devices 102(1)-102(43) is used to operatively couple and communicate between the mobile communication devices 102(1)-102(43), although other types and numbers of communication networks or systems with other types and numbers of connections and configurations can be used.

In this example, the mobile communication devices 102 (1)-102(43) are self configuring and dynamically form into clusters 104(1)-104(4) each having a tree structure with the clusters 104(1)-104(4) meshed together, although other types and numbers of clusters can be formed in other manners. As the mobile communication devices 102(1)-102(43) move, additional mobile communication devices enter and leave the region 106 and as events occur, the number of and formation of clusters is dynamic and continues to change. The formation of each of the clusters 104(1)-104(4) is based on a stored maximum available bandwidth, a maximum cluster size and a maximum number of permitted hops between devices in a cluster to maintain quality of service by way of example, although the formation of the cluster can be based on other numbers and types of parameters. A hop is a single connection from one of the mobile communication devices 102(1)-102(43) to another one of the mobile communication devices 102(1)-102(43). In this particular example, mobile communication devices 102(1)-102(11) are dynamically formed into one cluster 104(1) having a tree structure, mobile communication devices 102(12)-102(22) are dynamically formed into another cluster 104(2) having another tree structure, mobile communication devices 102(23)-102(33) are dynamically formed into another cluster 104(3) having another tree structure, and mobile communication devices 102(34)-102(43) are dynamically formed into another cluster 104(4) having another tree structure with the clusters 104(1)-104(4) meshed together, although other numbers and types of mobile and fixed position systems and devices can be included in each cluster and other numbers and types of clusters can be used. In this particular example: mobile communication devices 102(2) and 102(43), 102(7) and 102(37), and 102(11) and 102(36) provide connectivity between clusters 104(1) and 104(4); mobile communication devices 102(9) and 102(12), 102(10) and 102(13), and 102(11) and 102(14) provide connectivity between clusters 104(1) and 104(2); and mobile communication devices 102(14) and 102(31), 102(21) and 102(23), and 102(22) and 102(24) provide connectivity between clusters 104(2) and 104(3) with no direct connectivity between clusters 104(3) and 104(4), although other combinations and numbers of mobile communication devices can provide connectivity between the same and other combinations of the clusters.

Additionally, in each of the clusters 104(1)-104(4) one of the plurality of mobile communication devices 102(1)-102(43) is elected as a cluster head based on stored credentials, rank, available bandwidth and centricity of position relative to neighboring mobile communication devices 102(1)-102(43) by way of example, although other numbers and types of criteria and other manners for electing or otherwise determining which mobile communication device is a cluster head can be used. Each of the cluster heads and also members of each cluster can dynamically change based on the detection of an event, such as a failure one of one of the mobile communication devices 102(1)-102(43), a security breach at one of the mobile communication devices 102(1)-102(43), and an expiration of a set time period by way of example, although cluster heads and members of each cluster can change in other manners and based on other numbers and types of events. Each of the cluster heads also controls admission to the cluster 104(1)-104(4) to regulate traffic and authenticate users, although the cluster heads can have other types and numbers of functions. In this example, mobile communication device 102(5) is dynamically designated as the cluster head for cluster 104(1), mobile communication device 102(16) is dynamically designated as the cluster head for cluster 104(2), mobile communication device 102(26) is dynamically designated as the cluster head for cluster 104(3), and mobile communication device 102(39) is dynamically designated as the cluster head for cluster 104(4).

Each of the mobile communication devices 102(1)-102(43) also is assigned a unique identifier, also referred to as a UID, and one or more virtual identifiers, also referred to as a VID eliminating the need for previously stored routing tables. The unique identifier is a numerical identification which is assigned to and stored in memory in each of the mobile communication devices 102(1)-102(43), although each of the mobile communication devices 102(1)-102(43) can have other types and numbers of identifiers which are obtained in other manners. The virtual identifier is an address assignment that reflects the tree structure of each of the clusters 104(1)-104(4) used for traffic routing. In this example, each of the mobile communication devices 102(5), 102(16), 102(26), and 102(39) elected as a cluster head or root is assigned an ordinal number for a virtual identifier, for example, 1, 2, 3, and 4, respectively. The next one or more of the mobile communication devices 102(1)-102(4), 102(6)-102(15), 102(17)-102(25), 102(27)-102(38), and 102(40)-102(43) from each of the mobile communication devices 102(5), 102(16), 102(26), and 102(39) are assigned the next virtual identifiers. For example, if the mobile communication device 102(5) is the first cluster head, then its assigned virtual identifier would be 1. Next, the mobile communication devices 102(3) and 102(6)-102(8) which branch directly from mobile communication device 102(5) would then have a virtual identifier assigned as 11, 12, 13, and 14, respectively (the first digit indicating the connection to the same cluster head and the second digit indicating the number of first branch nodes). Next, the mobile communication devices 102(2) and 102(4) which branch directly from mobile communication device 102(3) would then have a virtual identifier assigned as 111 and 112, respectively (the first digit indicating the connection to the same cluster head, the second digit indicating the same connection to a first branch node, and the third digit indicating the number of second branch nodes). This process of dynamically assigning virtual identifiers continues accordingly through for all mobile communication devices 102(1)-102(43) in the clusters 104(1)-104(4) as explained and illustrated in greater detail herein. From the dynamic assignment of the virtual identifier, the position of each of the mobile communication devices 102(1)-102(43) in the tress structure of the meshed clusters 104(1)-104(4) is known. Since the network topology is both a tree and mesh structure, any node can have more than one virtual identifier as a member of multiple trees. Additionally, with this dynamic assignment of virtual identifiers, routing tables and route state maintenance is not required at the mobile communication devices 102(1)-102(43) which is more efficient and cost effective.

Although embodiments of the mobile communication devices 102(1)-102(43) are described and illustrated herein each can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
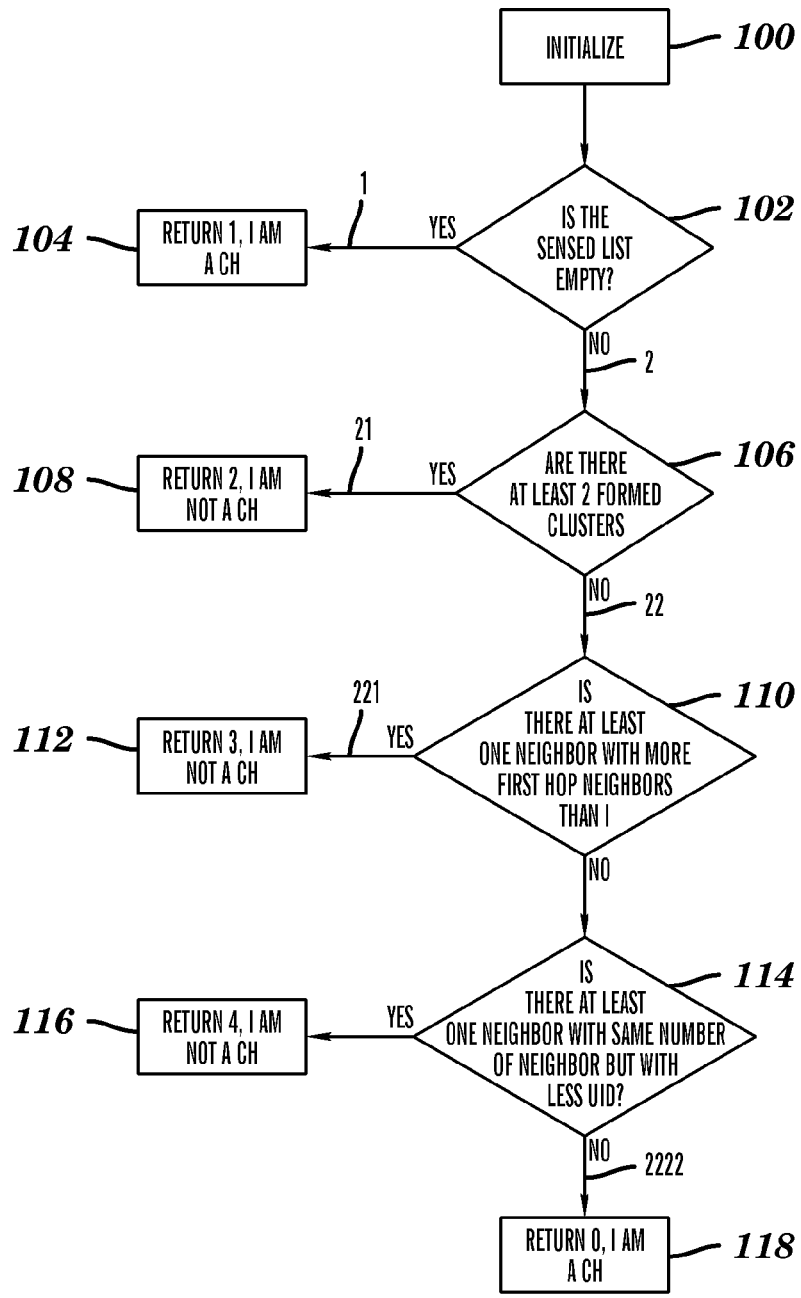
FIG. 2 is a flowchart of an example of a method for electing a mobile communication device as a cluster head.

Referring to FIG. 2, a flowchart of an example of a method for electing one of the mobile communication devices 102(1)-102(43) as a cluster head in each of the clusters 104(1)-104(4) is illustrated. In step 100, when one of the mobile communication devices 102(1)-102(43) first enters the region 106, a list of any stored detections of other mobile communication devices in the memory of the one of the mobile communication devices 102(1)-102(43) is initialized or set to a default setting of zero, although the one of the mobile communication devices 102(1)-102(43) could be initialized to other settings, such as have one or more listings of other devices in the region 106 added to the list from another device or system based on the particular region entered. Additionally, when one of the mobile communication devices 102(1)-102(43) first enters the region 106, the one of the mobile communication devices 102(1)-102(43) initially assumes it is a cluster head, although the one of the mobile communication devices 102(1)-102(43) could be initialized to other another setting about who is the cluster head, such as have the identification of another one of the mobile communication devices 102(1)-102(43) as the cluster head.

In step 102, the one of the mobile communication devices 102(1)-102(43) entering the region 106 determines if the list of any stored detections of other mobile communication devices in its memory is empty. If the one of the mobile communication devices 102(1)-102(43) determines the list is empty, then the No branch is taken to step 104 where the one of the mobile communication devices 102(1)-102(43) automatically records in memory it is a cluster head. If the one of the mobile communication devices 102(1)-102(43) determines the list is not empty, then the Yes branch is taken to step 106.

In step 106, the one of the mobile communication devices 102(1)-102(43) determines if there are at least two formed clusters. If the one of the mobile communication devices 102(1)-102(43) determines there are at least two formed clusters, then the Yes branch is taken to step 108 where the one of the mobile communication devices 102(1)-102(43) records in its memory that it is not a cluster head. If the one of the mobile communication devices 102(1)-102(43) determines there are not at least two formed clusters, then the No branch is taken to step 110.

In step 110, the one of the mobile communication devices 102(1)-102(43) determines if there is at least a neighboring one of the mobile communication devices 102(1)-102(43) with more first hop neighbors than itself. If the one of the mobile communication devices 102(1)-102(43) determines there is at least a neighboring one of the mobile communication devices 102(1)-102(43) with more first hop neighbors than itself, then the Yes branch is taken to step 112. In step 112, the one of the mobile communication devices 102(1)-102(43) records in its memory that it is not a cluster head, although other types of information could be recorded. If the one of the mobile communication devices 102(1)-102(43) determines there is not at least a neighboring one of the mobile communication devices 102(1)-102(43) with more first hop neighbors than itself, then the No branch is taken to step 114.

In step 114, the one of the mobile communication devices 102(1)-102(43) determines if there is at least a neighboring one of the mobile communication devices 102(1)-102(43) with the same number of first hop neighbors and a lower numerical unique identifier. If the one of the mobile communication devices 102(1)-102(43) determines there is at least a neighboring one of the mobile communication devices 102(1)-102(43) with the same number of first hop neighbors and a lower numerical unique identifier, then the Yes branch is taken to step 116. In step 116, the one of the mobile communication devices 102(1)-102(43) records in its memory that it is not a cluster head, although other types of information could be recorded. If the one of the mobile communication devices 102(1)-102(43) determines there is not at least a neighboring one of the mobile communication devices 102(1)-102(43) with the same number of first hop neighbors and a lower numerical unique identifier, then the No branch is taken to step 118. In step 118, the one of the mobile communication devices 102(1)-102(43) automatically records in memory it is a cluster head.

Figure 3A:
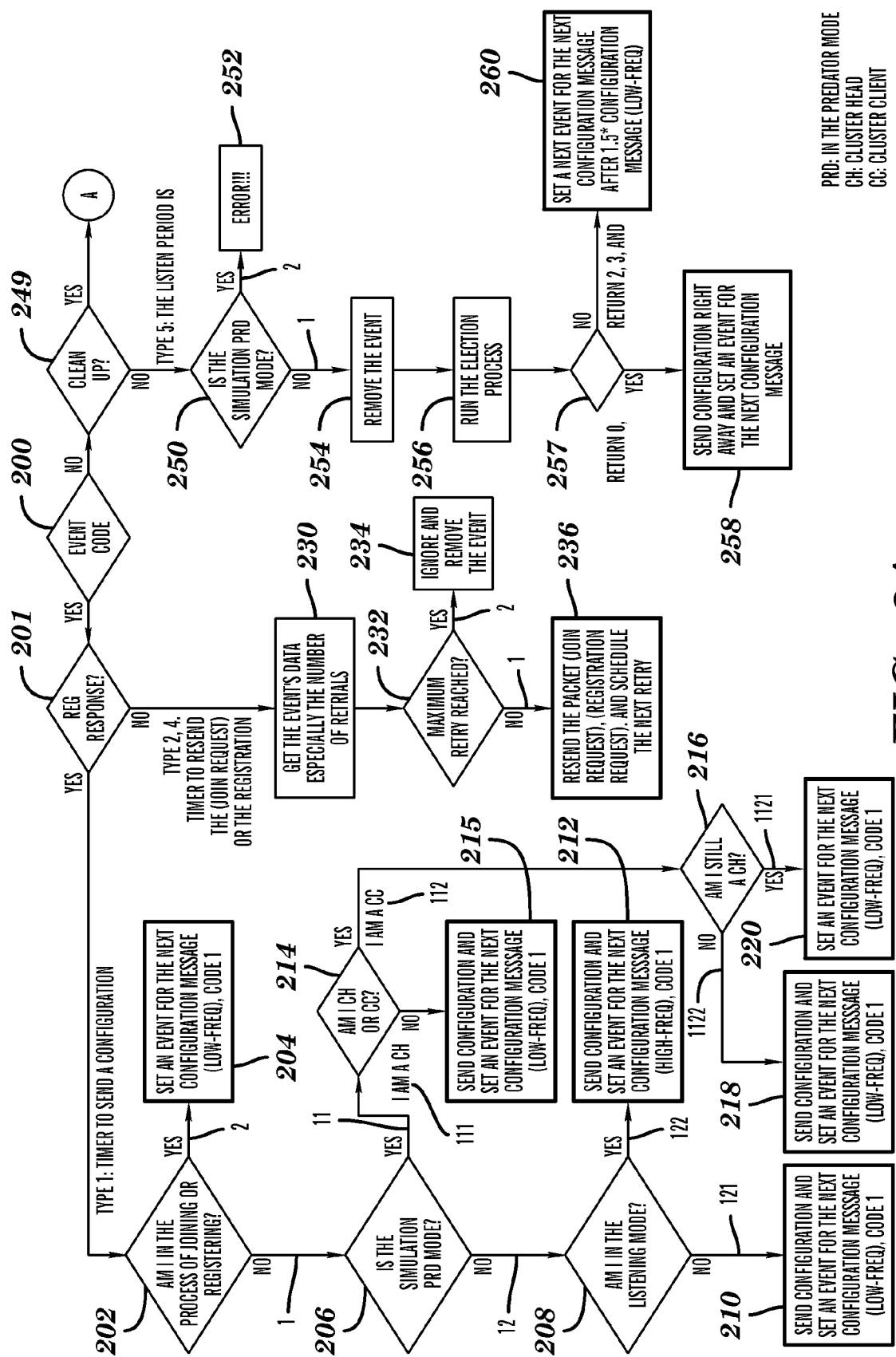
FIGS. 3A and 3B are flowcharts of an example of a method for detecting and processing one or more events.
Figure 3B:
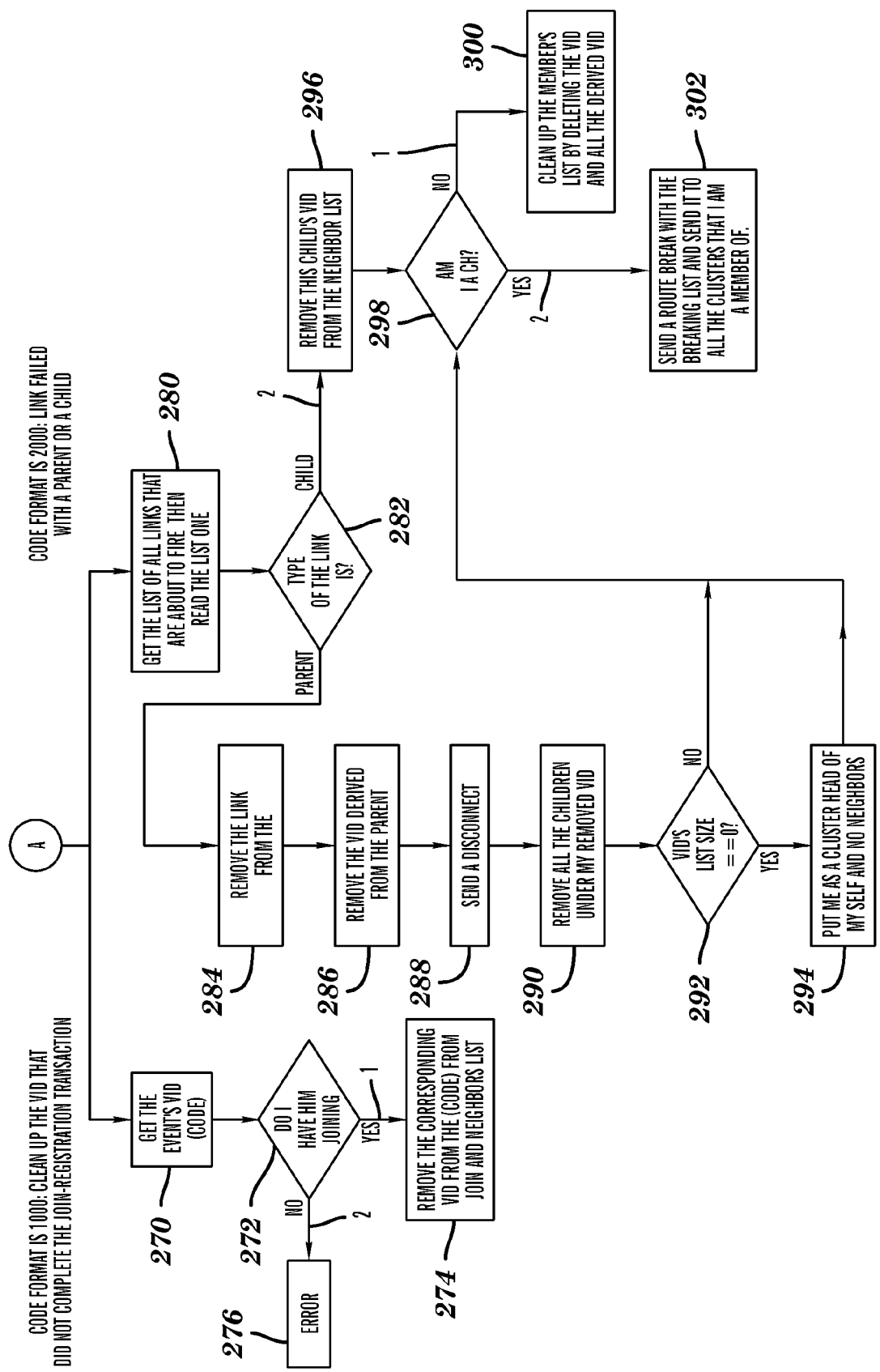

Referring to FIGS. 3A and 3B, examples of a method for detecting and processing one or more events with one of the mobile communication devices 102(1)-102(43) is illustrated. In step 200, one of the mobile communication devices 102(1)-102(43) determines whether a set listening mode period of time has expired, although other types and numbers of events, such as a failure of one of the mobile communication devices 102(1)-102(43) or a security breach with one of the mobile communication devices 102(1)-102(43), could be set and monitored for their occurrence. Throughout these particular embodiments, the one of the mobile communication devices 102(1)-102(43) which is elected or otherwise designated as the cluster head for each of the clusters 104(1)-104(4) manages operations, including the determinations and other actions described herein for their respective clusters 104(1)-104(4), although one or more of the other mobile communication devices 102(1)-102(43) which are not cluster heads could be used to manage and execute one or more of these operations if desired. If one of the mobile communication devices 102(1)-102(43) determines the listening mode period of time has not expired, then the Yes branch is taken to step 201. If one of the mobile communication devices 102(1)-102(43) determines the listening mode period of time has expired, then the No branch is taken to step 249.

In step 201, one of the mobile communication devices 102(1)-102(43) determines whether a response to a request to join or register from another one of the mobile communication devices 102(1)-102(43) has been provided, although other systems and devices can provide this monitoring. If one of the mobile communication devices 102(1)-102(43) determines a response has been provided, then the Yes branch is taken to step 202. If in step 201 one of the mobile communication devices 102(1)-102(43) determines a response has not been provided, then the No branch is taken to step 230.

In step 202, one of the mobile communication devices 102(1)-102(43) determines whether the provided response is a request to join or register in a cluster. If one of the mobile communication devices 102(1)-102(43) determines the provided response is a request to join or register in a cluster, then the Yes branch is taken to step 204. In step 204, the one of the mobile communication devices 102(1)-102(43) which would like to join or register sets an event to trigger the receipt of the next transmitted configuration message on joining or registering outside of the listening mode, although this can be configured in other manners. If in step 202 one of the mobile communication devices 102(1)-102(43) determines the provided response is not request to join or register in a cluster, then the No branch is taken to step 206.

In step 206, one of the mobile communication devices 102(1)-102(43) determines if it is in a privileged operating mode (PRD or Predator Mode). In this example, the privileged mode is when one or more of the cluster heads are assigned, i.e. not elected in the clusters 104(1)-104(4), although privileged mode can be configured in other manners. This can be a useful to force a particular one or ones of the of the mobile communication devices 102(1)-102(43) to become a cluster head. If one of the mobile communication devices 102(1)-102(43) determines it is not in a privileged operating mode, then the No branch is taken to step 208. If one of the mobile communication devices 102(1)-102(43) determines it is in a privileged operating mode, then the Yes branch is taken to step 214.

In step 208, one of the mobile communication devices 102(1)-102(43) determines it is still in the listening mode. If one of the mobile communication devices 102(1)-102(43) determines it is not still in the listening mode, then the No branch is taken to step 210. In step 210, the one of the mobile communication devices 102(1)-102(43) which would like to join or register is sent configuration information and sets an event to trigger the receipt of the next transmitted configuration message on joining or registering outside of the listening mode, although this can be configured in other manners. If one of the mobile communication devices 102(1)-102(43) determines it is still in the listening mode, then the Yes branch is taken to step 212. In step 212, the one of the mobile communication devices 102(1)-102(43) which would like to join or register is sent configuration information and sets an event to trigger the receipt of the next transmitted configuration message on joining or registering during the listening mode, although this can be configured in other manners. In the listening mode, the configuration message is sent more often which improves the probability of reception by the one of the mobile communication devices 102(1)-102(43) trying to join or register.

In step 214, the one of the mobile communication devices 102(1)-102(43) which would like to join or register determines if it is a cluster head. If the one of the mobile communication devices 102(1)-102(43) which would like to join or register determines it is not a cluster head, then the No branch is taken to step 215. In step 215, the one of the mobile communication devices 102(1)-102(43) which would like to join or register is sent configuration information and sets an event to trigger the receipt of the next transmitted configuration message on joining or registering outside of the listening mode, although this can be configured in other manners. If the one of the mobile communication devices 102(1)-102(43) which would like to join or register determines it is a cluster head, then the Yes branch is taken to step 216.

In step 216, the one of the mobile communication devices 102(1)-102(43) which would like to join or register determines if it is still a cluster head in another one of the clusters 104(1)-104(4). If the one of the mobile communication devices 102(1)-102(43) which would like to join or register determines it is not still a cluster head in another one of the clusters 104(1)-104(4), then the No branch is taken to step 218. In step 218, the one of the mobile communication devices 102(1)-102(43) which would like to join or register is sent configuration information and sets an event to trigger the receipt of the next transmitted configuration message on joining or registering outside of the listening mode, although this can be configured in other manners. If in step 216 the one of the mobile communication devices 102(1)-102(43) which would like to join or register determines it is still a cluster head in another one of the clusters 104(1)-104(4), then the Yes branch is taken to step 220. In step 220, the one of the mobile communication devices 102(1)-102(43) which would like to join or register sets an event to trigger the receipt of the next transmitted configuration message on joining or registering outside of the listening mode, although this can be configured in other manners.

In step 230, one of the mobile communication devices 102(1)-102(43) obtains data regarding attempts to obtain a response to a request to join or register from another one of the mobile communication devices 102(1)-102(43), such as the number of retries, although other types and numbers of parameters can be examined. In step 230, one of the mobile communication devices 102(1)-102(43) determines whether a stored maximum number of retries has been reached. If one of the mobile communication devices 102(1)-102(43) determines a stored maximum number of retries has been reached, then the Yes branch is taken to step 234. In step 234, one of the mobile communication devices 102(1)-102(43) ignores the triggering event and removes the event from happening again, so no further retries will be attempted. If in step 232 one of the mobile communication devices 102(1)-102(43) determines a stored maximum number of retries has not been reached, then the No branch is taken to step 236. In step 236, one of the mobile communication devices 102(1)-102(43) resends the request to the another one of the mobile communication devices 102(1)-102(43) which is trying to join or register and returns to step 201.

In step 249, the one of the mobile communication devices 102(1)-102(43) determines whether a clean up is required because a registration of the one of the mobile communication devices 102(1)-102(43) trying to join or register with at least one of the clusters 104(1)-104(4) was unsuccessful. If one of the mobile communication devices 102(1)-102(43) determines a clean up is required, then the Yes branch is taken to steps 270 and 280 in FIG. 3B. If one of the mobile communication devices 102(1)-102(43) determines a clean up is not required, then the No branch is taken to step 250.

In step 250, one of the mobile communication devices 102(1)-102(43) determines if the simulation is in a privileged operation mode. If one of the mobile communication devices 102(1)-102(43) determines the simulation is in privileged operation mode, then the Yes branch is taken to step 252. In step 252, an error message is produced because the listen period should never have been even entered in this mode. If one of the mobile communication devices 102(1)-102(43) determines the simulation is not in privileged operation mode, then the No branch is taken to step 254. In step 254, the one of the mobile communication devices 102(1)-102(43) clears the stored event in step 200 so the detection of the event will not occur again.

In step 256, one of the mobile communication devices 102(1)-102(43) runs the cluster head election process as set forth and described with reference to FIG. 1. In step 257, the one of the mobile communication devices 102(1)-102(43) which is trying to join or register determines if it is a cluster head. If in step 257 the one of the mobile communication devices 102(1)-102(43) determines it is a cluster head, then the Yes branch is taken to step 258. In step 258, the one of the mobile communication devices 102(1)-102(43) which is trying to join or register is sent configuration information and sets an event to trigger the receipt of the next transmitted configuration message outside of the listening mode, although this can be configured in other manners. If in step 257 the one of the mobile communication devices 102(1)-102(43) which is trying to join or register determines it is not a cluster head, then the No branch is taken to step 260. In step 260, the one of the mobile communication devices 102(1)-102(43) sets an event, such as an expiration of a set time period, to trigger the receipt of the next transmitted configuration message outside of the listening mode, although this can be configured in other manners. This ensures a configuration message will be sent out by one of the mobile communication devices 102(1)-102(43) if the one of the mobile communication devices 102(1)-102(43) which is the cluster head has not sent one out at an established interval.

Referring to FIG. 3B, a method for cleaning up virtual identifiers because of a change with one of the mobile communication devices 102(1)-102(43), such as from an unsuccessful registration or a failed link between two or more of the mobile communication devices 102(1)-102(43) by way of example, is illustrated and described. In step 270, a data record related to the event which triggered the clean up is examined for a virtual identifier (VID) of the one or more of the mobile communication devices 102(1)-102(43) impacted by the event. In step 272, one of the mobile communication devices 102(1)-102(43) determines whether the event occurred while one of the mobile communication devices 102(1)-102(43) was in the middle of a joining process to one of the clusters 104(10-104(4). If in step 272 one of the mobile communication devices 102(1)-102(43) determines the one of the mobile communication devices 102(1)-102(43) was in the middle of a joining process, then the Yes branch is taken to step 274. In step 274, the virtual identifiers for the one or more of the mobile communication devices 102(1)-102(43) related to the one of the mobile communication devices 102(1)-102(43) which was in the middle of an unsuccessful joining process are adjusted or removed. If in step 272 one of the mobile communication devices 102(1)-102(43) determines the one of the mobile communication devices 102(1)-102(43) trying to join or register is not in the middle of a joining process, then the No branch is taken to step 276. Instep 276, the one of the mobile communication devices 102(1)-102(43) which currently is designated as the cluster head for the particular cluster 104(1)-104(4) involved issues an error message since a joining event should have never occurred.

In step 280, one of the mobile communication devices 102(1)-102(43) obtains and reviews a list of all related links in the one or more clusters 104(1)-104(4) impacted by the event. In step 282, one of the mobile communication devices 102(1)-102(43) determines whether each obtained link is at a parent or a child. If in step 282 one of the mobile communication devices 102(1)-102(43) determines the link is at a parent, then the parent branch is taken to step 284.

In step 284, one of the mobile communication devices 102(1)-102(43) removes the one or more links from a stored maintenance list of current links provided with configuration information, although the links could be stored at other locations in other manners. In step 286, one of the mobile communication devices 102(1)-102(43) removes the virtual identifier derived from the parent. In step 288, one of the mobile communication devices 102(1)-102(43) sends a disconnect message to each of the mobile communication devices 102(1)-102(43) impacted by the removed link and virtual identifier. In step 290, one of the mobile communication devices 102(1)-102(43) removes all of the children under the removed virtual identifier, i.e. since the link is lost to the parent, all links to the children are lost as well.

In step 292, one of the mobile communication devices 102(1)-102(43) determines if one of the mobile communication devices 102(1)-102(43) has a list of virtual identifiers equals to zero, i.e. there are no links to any neighboring mobile communication devices 102(1)-102(43). If in step 292 one of the mobile communication devices 102(1)-102(43) has a list of virtual identifiers equal to zero, then the Yes branch is taken to step 294. In step 294, the one of the mobile communication devices 102(1)-102(43) with no neighbors is elected or otherwise designated as a cluster head of itself with no neighbors and proceeds to step 298. If in step 292 one of the mobile communication devices 102(1)-102(43) does not have a list of virtual identifiers equal to zero, then the No branch is taken to step 298.

If back in step 282 one of the mobile communication devices 102(1)-102(43) determines the link is at a child, then the child branch is taken to step 296. In step 296, one of the mobile communication devices 102(1)-102(43) removes the virtual identifier for this child from the list of virtual identifiers at each of the neighboring mobile communication devices 102(1)-102(43).

In step 298, the one of the mobile communication devices 102(1)-102(43) which is the child determines if it is a cluster head. If in step 298 the one of the mobile communication devices 102(1)-102(43) which is the child determines it is not a cluster head, then the No branch is taken to step 300. In step 300, the one of the mobile communication devices 102(1)-102(43) which is the child cleans up the members list by deleting the lost virtual identifier and all the derived virtual identifier. Each of the clusters 104(1)-104(4) has a members list of all of the mobile communication devices 102(1)-102(43) in the cluster. This differs from the neighbors list which is a list of the mobile communication devices 102(1)-102(43) directly connected to this one of the mobile communication devices 102(1)-102(43).

If in step 298 the one of the mobile communication devices 102(1)-102(43) which is the child determines it is a cluster head, then the Yes branch is taken to step 302. In step 302, the one of the mobile communication devices 102(1)-102(43) which is now a cluster head sends a route break to all of the clusters 104(1)-104(4) this one of the mobile communication devices 102(1)-102(43) is a member of.

Figure 4:
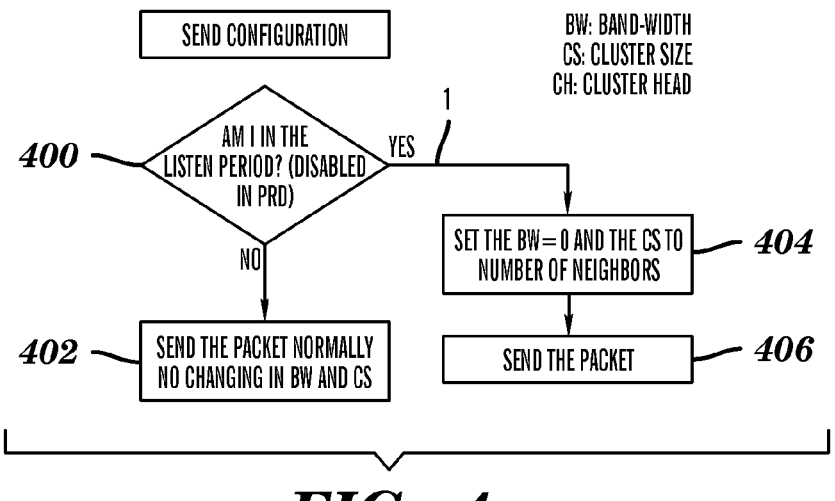
FIG. 4 is a flowchart of an example of a method for sending configuration data of cluster conditions to a mobile communication device joining a cluster.

Referring to FIG. 4, a flowchart of an example of a method for sending configuration data of cluster conditions to one of the mobile communication devices 102(1)-102(43) joining one of the clusters 104(1)-104(4) is illustrated. In step 400, each of the mobile communication devices 102(1)-102(43) which is elected or otherwise designated as a cluster head in the clusters 104(1)-104(4) determines if it is in a listen period. The listen period is disabled if the simulation is in a privileged operating mode. If in step 400 each of the mobile communication devices 102(1)-102(43) which is elected or otherwise designated as a cluster head determines it is not in a listen period, then the No branch is taken to step 402. In step 402, each of the mobile communication devices 102(1)-102(43) which is elected or otherwise designated as a cluster head sends the configuration data normally with no changes to the current set bandwidth (BW) or cluster size (CS). The available bandwidth and cluster size are two parameters used in controlling membership into each of the clusters 104(1)-104(4), although other numbers and types of parameters could be used.

If in step 400 each of the mobile communication devices 102(1)-102(43) which is elected or otherwise designated as a cluster head determines it is in a listen period, then the Yes branch is taken to step 404. In step 404, each of the mobile communication devices 102(1)-102(43) which is elected or otherwise designated as a cluster head sets the bandwidth equal to zero and the cluster size to equal a current number of neighboring ones of the mobile communication devices 102(1)-102(43) in each of the clusters 104(1)-104(4). This limits any more additional mobile communication devices entering the region 106 from joining any of the clusters 104(1)-104(4) by indicating that there is no available bandwidth and the cluster size is fixed at the current membership. In step 406, each of the mobile communication devices 102(1)-102(43) which is elected or otherwise designated as a cluster head sends the configuration data.

Figure 5:
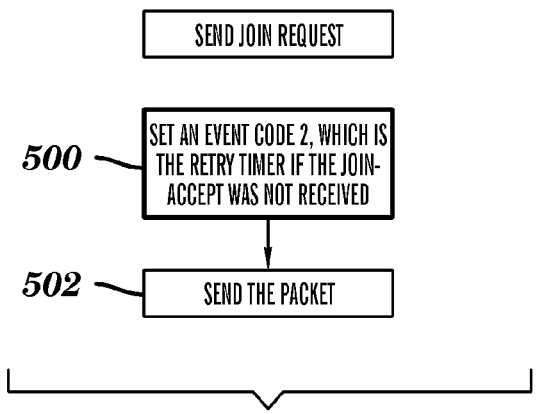
FIG. 5 is a flowchart of an example of a method for a mobile communication device sending a request to join a cluster.

Referring to FIG. 5, a flowchart of an example of a method for one of the mobile communication devices 102(1)-102(43) sending a request to join one of the clusters 104(1)-104(4) is illustrated. In step 500, one of the mobile communication devices 102(1)-102(43) sets an event comprising a set period of time to trigger a timer interrupt to retry the request for a set number of times if a join accept is not received. In step 502, the one of the mobile communication devices 102(1)-102(43) seeking to join one of the clusters 104(1)-104(4) sends the join request packet to the one of the mobile communication devices 102(1)-102(43) which is the cluster head of one of the clusters 104(1)-104(4).

Figure 6:
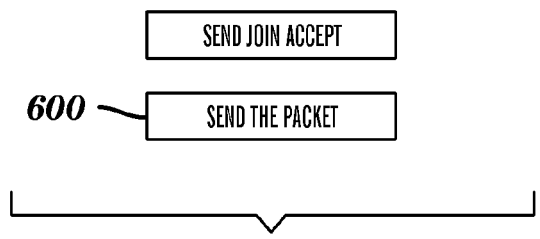
FIG. 6 is a flowchart of an example of a method for sending an acceptance to a mobile communication device to join a cluster.
Figure 14:
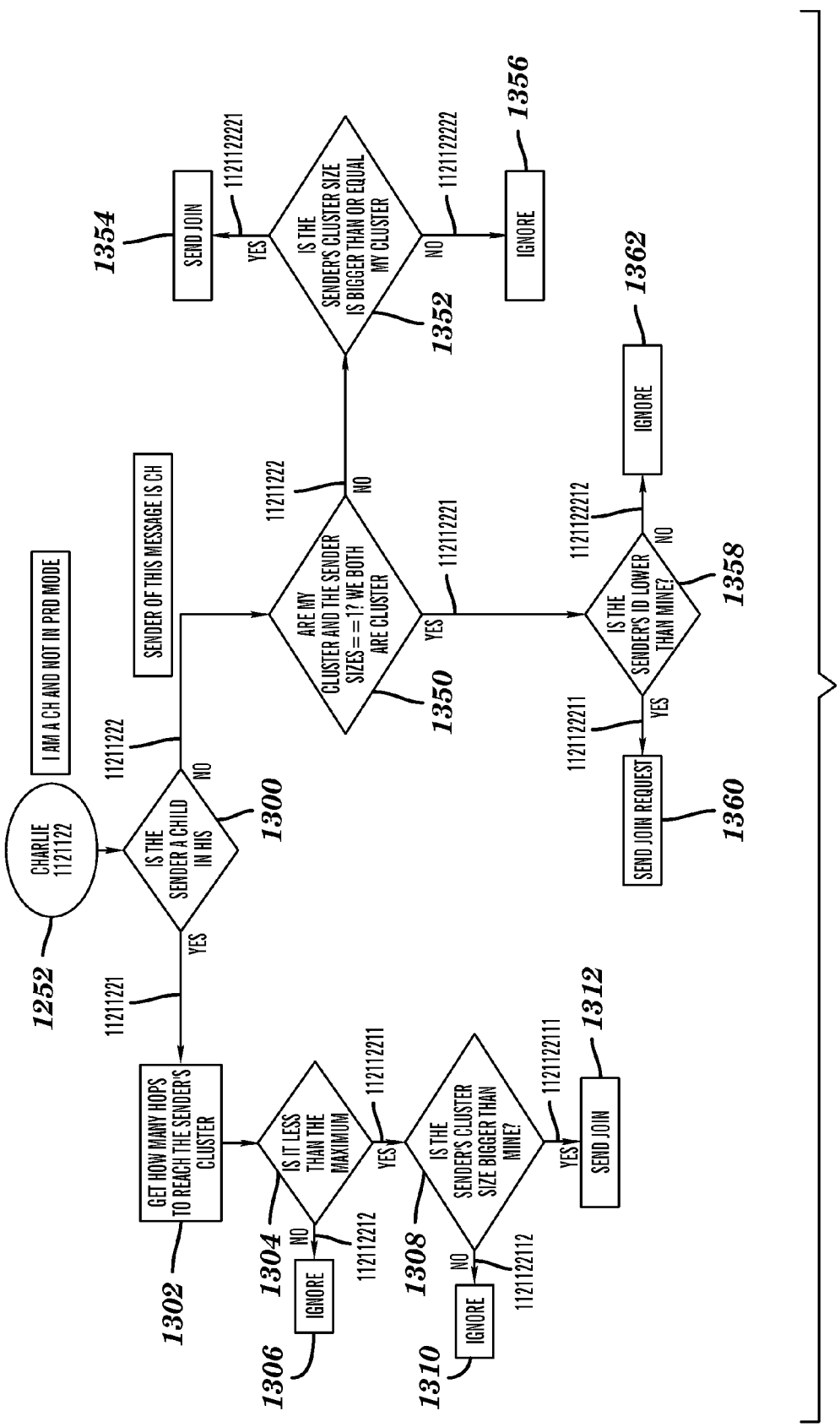
FIG. 14 is a flowchart of yet another example of a method for determining if a mobile communication device can join a cluster is not already a member of and is not a cluster head for any other cluster.

Referring to FIG. 6, a flowchart of an example of a method for sending an acceptance to one of the mobile communication devices 102(1)-102(43) to join one of the clusters 104 (1)-104(4) is illustrated. In step 600, one of the mobile communication devices 102(1)-102(43) which is the cluster head of the one of the clusters 104(1)-104(4) simply sends a join accept packet to the requesting one of the mobile communication devices 102(1)-102(43). An example of a method for determining if requesting one of the mobile communication devices 102(1)-102(43) can join one of the clusters 104(1)-104(4) it is not already a member of and is not a cluster head for any other cluster is illustrated and described in greater detail with reference to FIG. 14.

Figure 7:
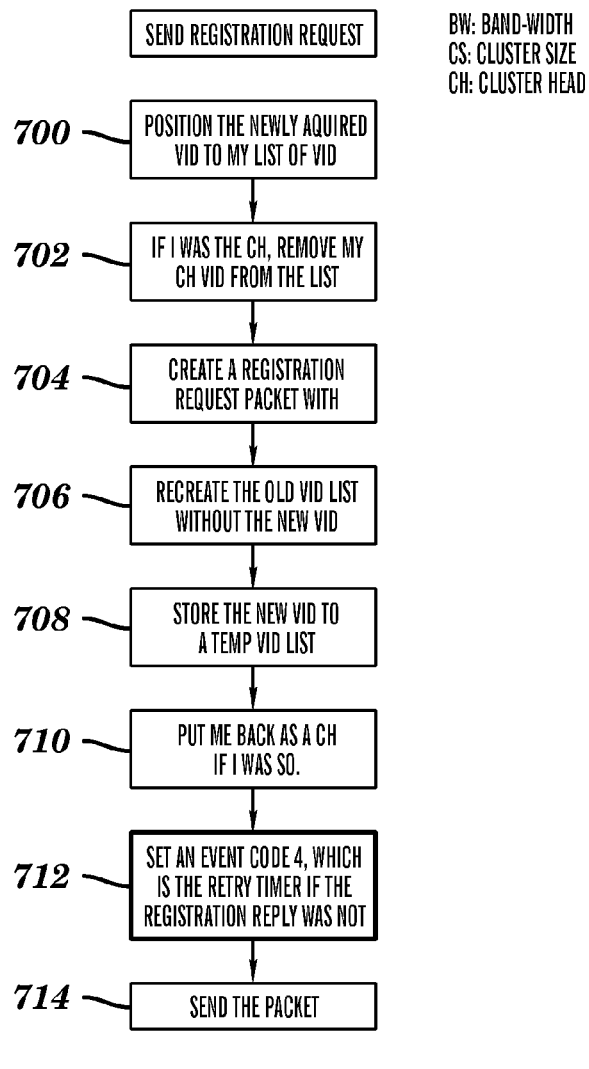
FIG. 7 is a flowchart of an example of a method for sending a request to register a membership of a mobile communication device within a cluster.

Referring to FIG. 7, a flowchart of an example of a method for sending a request to register a membership of one of the mobile communication devices 102(1)-102(43) within one of the clusters 104(1)-104(4) is illustrated. In step 700, the requesting one of the mobile communication devices 102(1)-102(43) positions the newly acquired virtual identifier in a list of virtual identifiers stored in memory in the requesting one of the mobile communication devices 102(1)-102(43), although the list can be stored in other manners and at other locations. With the present invention, the virtual identifiers are dynamically determined for each of the one of the mobile communication devices 102(1)-102(43) which eliminates the need for storing predetermined routing tables for routing traffic which can quickly become outdated.

In step 702, the requesting one of the mobile communication devices 102(1)-102(43) removes its virtual identifier from the list of virtual identifiers if the accepting one of the mobile communication devices 102(1)-102(43) designated as the cluster head is itself. This prevents the requesting one of the mobile communication devices 102(1)-102(43) from joining one of the clusters 104(1)-104(4) for which it already is the cluster head.

In step 704, the requesting one of the mobile communication devices 102(1)-102(43) creates a registration request packet with data received in the join accept. In step 706, the requesting one of the mobile communication devices 102(1)-102(43) recreates the old list of virtual identifiers without the new virtual identifier. In step 708, the requesting one of the mobile communication devices 102(1)-102(43) stores the new virtual identifier in a temporary list of virtual identifiers in memory in the requesting one of the mobile communication devices 102(1)-102(43), although the list can be stored in other manners and at other locations.

In step 710, if the requesting one of the mobile communication devices 102(1)-102(43) previously was the cluster head, then the requesting one of the mobile communication devices 102(1)-102(43) is put back as the cluster head. In step 712, the requesting one of the mobile communication devices 102(1)-102(43) sets an event which is a retry timer which expires after a set period of time if the registration reply was not received. If the event of the set time period for this retry timer expiring occurs, the requesting one of the mobile communication devices 102(1)-102(43) will detect and process the occurrence of the event and process. Examples of a method for detecting and processing one or more events with one of the mobile communication devices 102(1)-102(43) is illustrated and described in greater detail with reference to FIGS. 3A-3B. Referring back to FIG. 7, in step 714, the requesting one of the mobile communication devices 102(1)-102(43) sends the registration request packet to the one of the mobile communication devices 102(1)-102(43) designated as the cluster head in the corresponding one of the clusters 104(1)-104(4).

Figure 8:
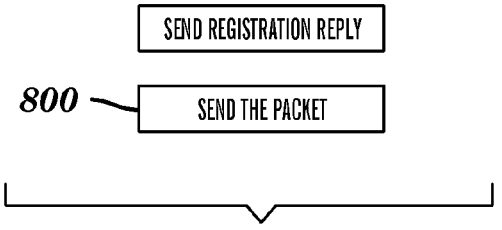
FIG. 8 is a flowchart of an example of a method for sending a reply to a request to register a membership of a mobile communication device within a cluster.

Referring to FIG. 8, a flowchart of an example of a method for sending a reply to a request to register a membership of a requesting one of the mobile communication devices 102(1)-102(43) within one of the clusters 104(1)-104(4) is illustrated. In step 800, the one of the mobile communication devices 102(1)-102(43) designated as the cluster head in the corresponding one of the clusters 104(1)-104(4) sends the registration reply packet to the requesting one of the mobile communication devices 102(1)-102(43). An example of a method for processing an acceptance of one of the mobile communication devices 102(1)-102(43) to join one of the clusters 104(1)-104(4) is illustrated and described in greater detail with reference to FIG. 16.

Figure 9:
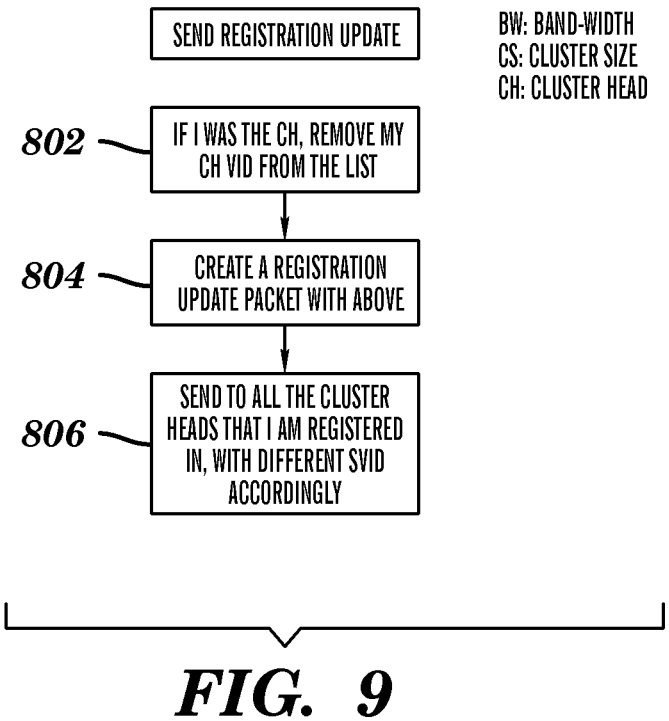
FIG. 9 is a flowchart of an example of a method for sending a registration update to a mobile communication device elected as a cluster head about a change in status in a cluster.

Referring to FIG. 9, a flowchart of an example of a method for sending a registration update to the mobile communication devices 102(1)-102(43) designated as the cluster heads in the clusters 104(1)-104(4) about a change in status in one of the clusters 104(1)-104(4) is illustrated. In step 802, if there is a change with one of the mobile communication devices 102(1)-102(43) designated as the cluster head, the virtual identifier of the one of the mobile communication devices 102(1)-102(43) no longer designated as the cluster head in one of the clusters 104(1)-104(4) is removed from the list. In step 804, one of the mobile communication devices 102(1)-102(43) creates a registration update packet with information about the change in status in one of the clusters 104(1)-104 (4). In step 806, one of the mobile communication devices 102(1)-102(43) sends the registration update packet to the mobile communication devices 102(1)-102(43) designated as the cluster heads in the clusters 104(1)-104(4) to provide the update.

Figure 10:
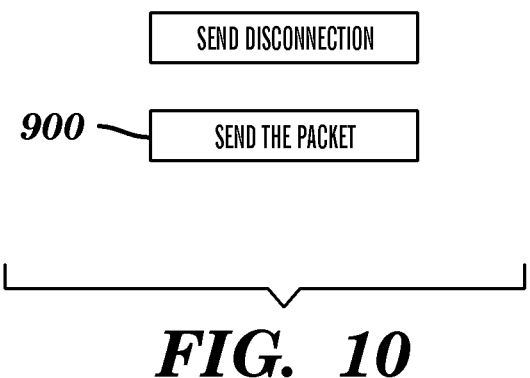
FIG. 10 is a flowchart of an example of a method for disconnecting a mobile communication device from membership within a cluster.

Referring to FIG. 10, a flowchart of an example of a method for disconnecting one of the mobile communication devices 102(1)-102(43) from membership within one of the clusters 104(1)-104(4) is illustrated. In step 900, the one of the mobile communication devices 102(1)-102(43) designated as the cluster head in the corresponding one of the clusters 104(1)-104(4) sends the disconnect packet to the one of the mobile communication devices 102(1)-102(43) being dropped from one or more of the clusters 104(1)-104(4). This disconnect process occurs when one of the mobile communication devices 102(1)-102(43) has an event, such as a failure or a security breach, requiring it to be dropped from one of the clusters 104(1)-104(4), although one or more of the mobile communication devices 102(1)-102(43) could be dropped for other types and numbers of events or reasons.

Figure 11:
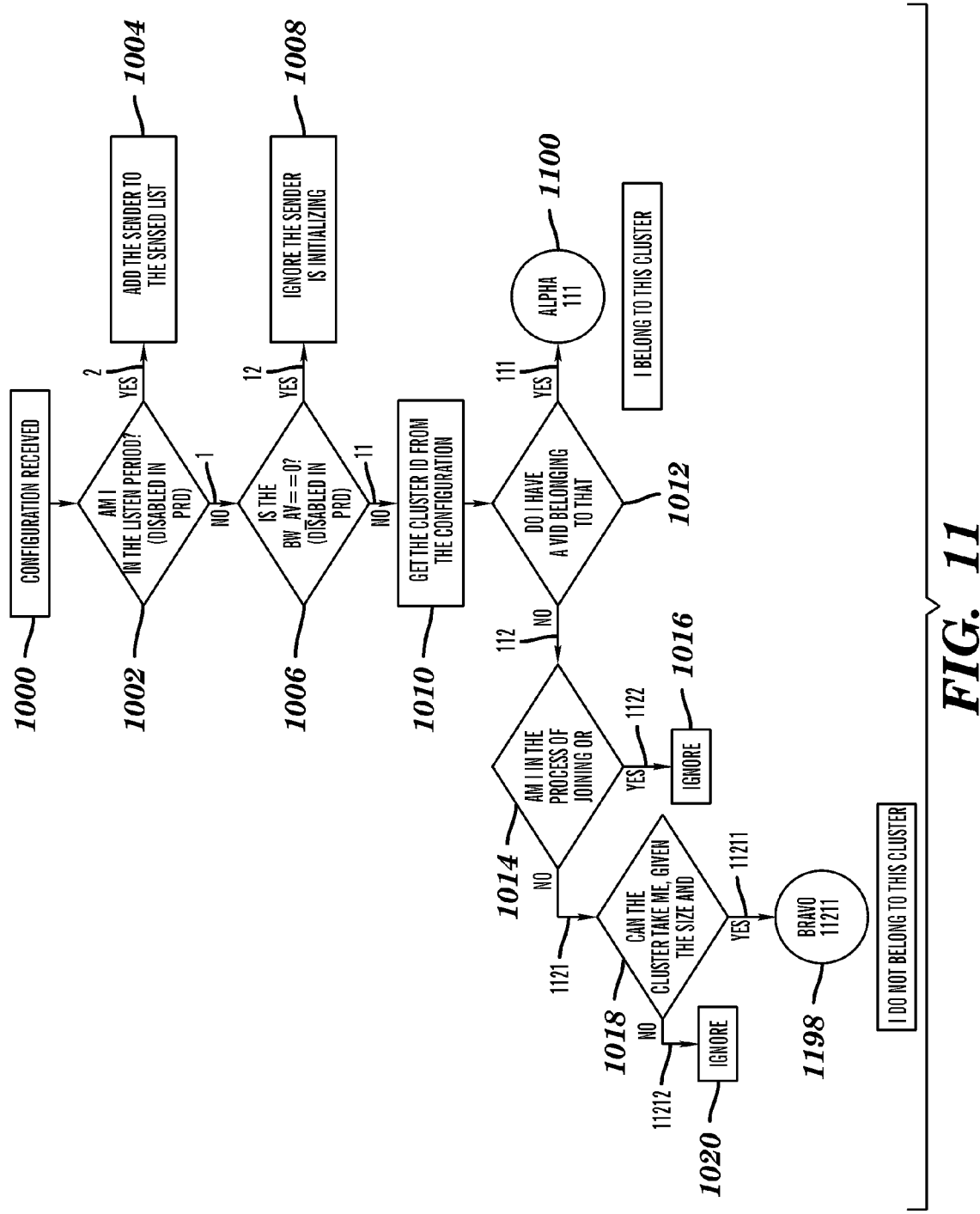
FIG. 11 is a flowchart of an example of a method for determining if a mobile communication device belongs to a cluster.

Referring to FIG. 11, a flowchart of an example of a method for determining if one of the mobile communication devices 102(1)-102(43) belongs to one of the clusters 104(1)-104(4) is illustrated. In step 1000, one of the mobile communication devices 102(1)-102(43) receives the configuration data. In step 1002, one of the mobile communication devices 102(1)-102(43) determines if it is in a listen period. This listen period is disabled if the simulation is in a privileged operating mode. If the configuration receiving one of the mobile communication devices 102(1)-102(43) determines it is in a listen period, then the Yes branch is taken to step 1004. In step 1004, the one of the mobile communication devices 102(1)-102(43) adds the sending one of the mobile communication devices 102(1)-102(43) to a sensed list. If the configuration receiving one of the mobile communication devices 102(1)-102(43) determines it is not in a listen period, then the No branch is taken to step 1006.

In step 1006, the configuration receiving one of the mobile communication devices 102(1)-102(43) determines if the available bandwidth (BW_AV) has been set to equal zero. If in step 1006 the configuration receiving one of the mobile communication devices 102(1)-102(43) determines the available bandwidth (BW_AV) equals zero, then the Yes branch is taken to step 1008 because the one of the mobile communication devices 102(1)-102(43) designated as the cluster head is indicating it has no bandwidth available. By way of example only, the available bandwidth may be set to zero when the sending one of the mobile communication devices 102(1)-102(43) is initializing and the corresponding one of the clusters 104(1)-104(4) is not ready to accept any additional mobile communication devices 102(1)-102(43). In step 1008, the configuration receiving one of the mobile communication devices 102(1)-102(43) ignores the transmission of the configuration data.

If in step 1006 the configuration receiving one of the mobile communication devices 102(1)-102(43) determines the available bandwidth (BW_AV) does not equal zero and has available bandwidth, then the No branch is taken to step 1010. In step 1010, the configuration receiving one of the mobile communication devices 102(1)-102(43) gets the identification of the one of the one or more clusters 104(1)-104(4) available to be joined.

In step 1012, the configuration receiving one of the mobile communication devices 102(1)-102(43) determines if it has a virtual identifier belonging to the one of the clusters 104(1)-104(4) available to be joined. If the configuration receiving one of the mobile communication devices 102(1)-102(43) determines it has a virtual identifier belonging to that one of the clusters 104(1)-104(4), then the Yes branch is taken to step 1100 because it already is a member of that one of the clusters 104(1)-104(4). In step 1100, the processing continues to the method for processing a request to join one of the clusters 104(1)-104(4) the requesting one of the mobile communication devices 102(1)-102(43) is already a member of is illustrated and described in greater detail with reference to FIG. 12. If the configuration receiving one of the mobile communication devices 102(1)-102(43) determines it does not have a virtual identifier belonging to the one of the clusters 104(1)-104(4) available to be joined, i.e. it is not a current member, then the No branch is taken to step 1014.

In step 1014, the configuration receiving one of the mobile communication devices 102(1)-102(43) determines if it already is in the process of joining or registering for membership to the one of the clusters 104(1)-104(4) available to be joined. If the configuration receiving one of the mobile communication devices 102(1)-102(43) determines it already is in the process of joining or registering for membership to the one of the clusters 104(1)-104(4) available to be joined, then the Yes branch is taken to step 1016 where the received configuration data is ignored. If the configuration receiving one of the mobile communication devices 102(1)-102(43) determines it is not already in the process of joining or registering for membership to the one of the clusters 104(1)-104(4) available to be joined, then the No branch is taken to step 1018. Even if the opportunity to join is for a different one of the clusters 104(1)-104(4), if another one of the mobile communication devices 102(1)-102(43) is currently joining the one of the clusters 104(1)-104(4) available to be joined, the configuration receiving one of the mobile communication devices 102(1)-102(43) waits for the currently executing join process to complete before proceeding to step 1018.

In step 1018, the configuration receiving one of the mobile communication devices 102(1)-102(43) determines if the one of the clusters 104(1)-104(4) available to be joined can accept the configuration receiving one of the mobile communication devices 102(1)-102(43) based on a set maximum available bandwidth, maximum cluster size, and maximum number of hops between mobile communication devices 102(1)-102(43) in the one of the clusters 104(1)-104(4) available to be joined, although other numbers and types of parameters can be used. If the one of the mobile communication devices 102(1)-102(43) designated as the cluster head for the one of the clusters 104(1)-104(4) available to be joined cannot take on the configuration receiving one of the mobile communication devices 102(1)-102(43), then the No branch is taken to step 1020. In step 1020, the configuration receiving one of the mobile communication devices 102(1)-102(43) ignores or is otherwise prevented from joining the one of the clusters 104(1)-104(4). If the one of the mobile communication devices 102(1)-102(43) designated as the cluster head for the one of the clusters 104(1)-104(4) available to be joined can take on the configuration receiving one of the mobile communication devices 102(1)-102(43), then the Yes branch is taken to step 1198. In step 1198, the configuration receiving one of the mobile communication devices 102(1)-102(43) proceeds further to the exemplary method for determining if one of the mobile communication devices 102(1)-102(43) can join one of the clusters 104(1)-104(4) illustrated and described in greater detail with reference to FIG. 13.

Figure 12:
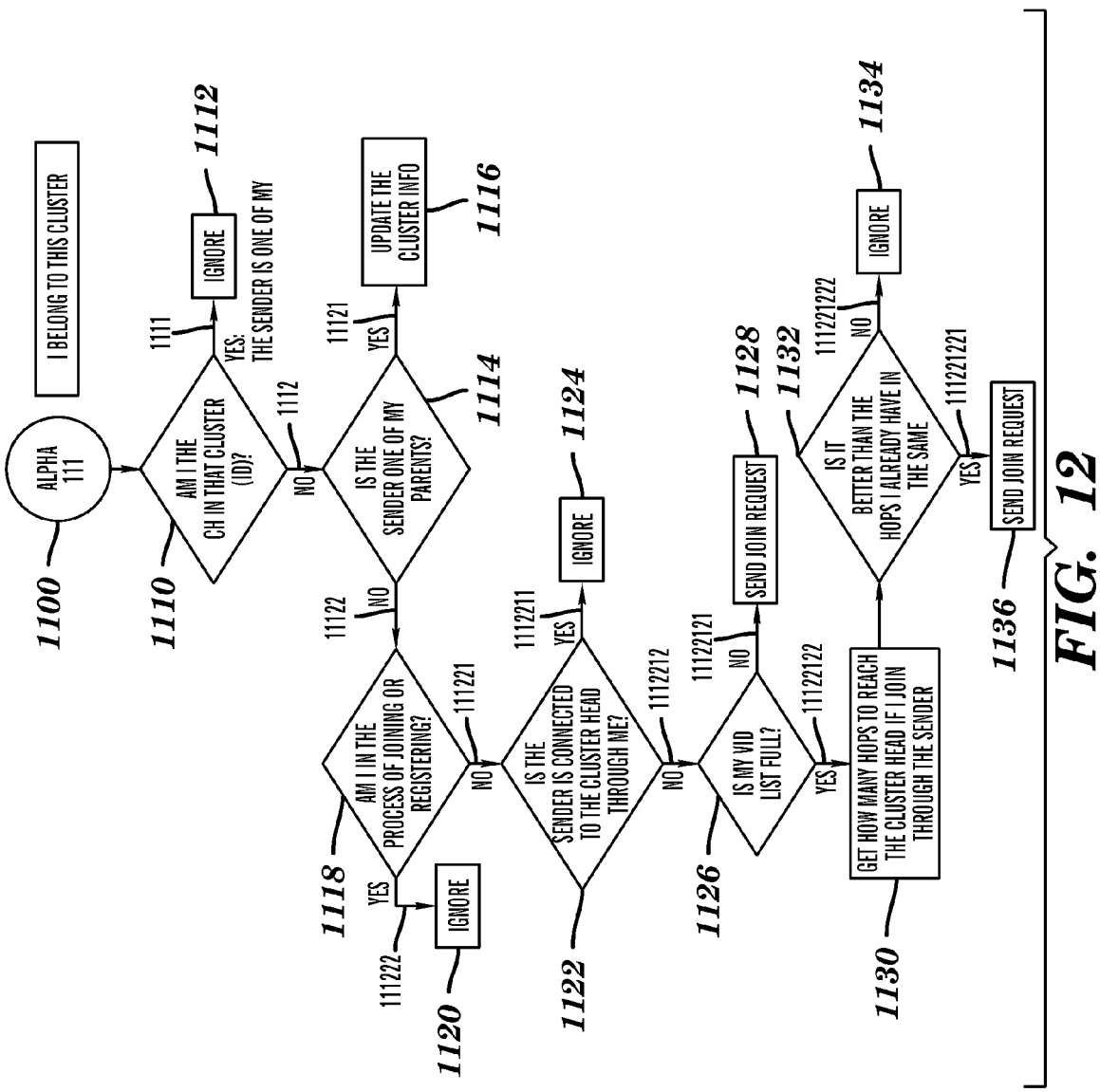

Referring to FIG. 12, a flowchart of an example of a method for processing a request to join one of the clusters 104(1)-104(4) the requesting one of the mobile communication devices 102(1)-102(43) is already a member of. In step 1110, the requesting one of the mobile communication devices 102(1)-102(43) first determines if it is the cluster head of the one of the clusters 104(1)-104(4). If in step 1110 the requesting one of the mobile communication devices 102(1)-102(43) determines it is the cluster head of the one of the clusters 104(1)-104(4) it already is a member of, then the Yes branch is taken to step 1112. In step 1112, the requesting one of the mobile communication devices 102(1)-102(43) ignores the request from the configuration data because the requesting one of the mobile communication devices 102(1)-102(43) heard its own configuration data. If in step 1110 the requesting one of the mobile communication devices 102(1)-102(43) determines it is not the cluster head in the one of the clusters 104(1)-104(4) it already is a member of, then the No branch is taken to step 1114.

In step 1114, the requesting one of the mobile communication devices 102(1)-102(43) determines if the sending one of the mobile communication devices 102(1)-102(43) which provided the configuration data is one of its parents. If in step 1114 the requesting one of the mobile communication devices 102(1)-102(43) determines the sending one of the mobile communication devices 102(1)-102(43) is one of its parents, then the Yes branch is taken to step 1116. In step 1116, the requesting one of the mobile communication devices 102(1)-102(43) updates the cluster information based on the contents of the received configuration data, but there is no additional action to take since the sending one of the mobile communication devices 102(1)-102(43) is one of the parents of the requesting one of the mobile communication devices 102(1)-102(43). Therefore, the requesting one of the mobile communication devices 102(1)-102(43) is a first hop member in this one of the clusters 104(1)-104(4) it already is a member of. If in step 1114 the requesting one of the mobile communication devices 102(1)-102(43) determines the sending one of the mobile communication devices 102(1)-102(43) is not one of its parents, then the No branch is taken to step 1118.

In step 1118, the requesting one of the mobile communication devices 102(1)-102(43) determines if it is in the process of joining or registering. If in step 118 the requesting one of the mobile communication devices 102(1)-102(43) determines it is in the process of joining or registering, then the Yes branch is taken to step 1120. In step 1120, the requesting one of the mobile communication devices 102(1)-102(43) ignores the opportunity to join again and lets the current join process complete because it already is a member of this one of the clusters 104(1)-104(4). If in step 118 the requesting one of the mobile communication devices 102(1)-102(43) determines it is not in the process of joining or registering, then the No branch is taken to step 1122.

In step 1122, the requesting one of the mobile communication devices 102(1)-102(43) determines if the sending one of the mobile communication devices 102(1)-102(43) is connected to the one of the mobile communication devices 102(1)-102(43) designated as the cluster head in the corresponding one of the clusters 104(1)-104(4) through itself. If in step 1122 the requesting one of the mobile communication devices 102(1)-102(43) determines the sending one of the mobile communication devices 102(1)-102(43) is connected to the one of the mobile communication devices 102(1)-102(43) designated as the cluster head in the corresponding one of the clusters 104(1)-104(4) through the requesting one of the mobile communication devices 102(1)-102(43), then the Yes branch is taken to step 1124. In step 1124, the requesting one of the mobile communication devices 102(1)-102(43) ignores the re-join opportunity because the position in the tree structure is further downstream, i.e. more hops than the current position. If one of the mobile communication devices 102(1)-102(43) determines the sending one of the mobile communication devices 102(1)-102(43) is not connected to the one of the mobile communication devices 102(1)-102(43) designated as the cluster head in the corresponding one of the clusters 104(1)-104(4) through itself, then the No branch is taken to step 1126. This means requesting one of the mobile communication devices 102(1)-102(43) can re-join the one of the clusters 104(1)-104(4) at a better position in the tree structure closer to the one of the mobile communication devices 102(1)-102(43) designated as the cluster head in the corresponding one of the clusters 104(1)-104(4).

In step 1126, the requesting one of the mobile communication devices 102(1)-102(43) determines if the list of virtual identifiers stored in its memory is full. If in step 1126 the requesting one of the mobile communication devices 102(1)-102(43) determines the list of virtual identifier is not full, then the No branch is taken to step 1128. In step 1128, the requesting one of the mobile communication devices 102(1)-102(43) sends a join request, joining the same one of the clusters 104(1)-104(4), but at better position in the tree structure. If in step 1126 the one of the mobile communication devices 102(1)-102(43) determines the list of virtual identifier stored in its memory is full, then the Yes branch is taken to step 1130. In step 1130, the requesting one of the mobile communication devices 102(1)-102(43) analyzes the virtual identifiers on the list to determine how many hops are required to reach the one of the mobile communication devices 102(1)-102(43) designated as the cluster head, although other manners for analyzing based on other factors could be used. The analysis is conducted to determine if one of the virtual identifiers on the list could be dropped for a better position in the tree structure of the one of the clusters 104(1)-104(4) with a new virtual identifier obtained by joining through the sending one of the mobile communication devices 102(1)-102(43).

In step 1132, the requesting one of the mobile communication devices 102(1)-102(43) determines if a number of hops to reach the one of the mobile communication devices 102(1)-102(43) designated as the cluster head in the corresponding one of the clusters 104(1)-104(4) through this new sending one of the mobile communication devices 102(1)-102(43) is better than the number of hops for the virtual identifiers already on the stored list of virtual identifiers the requesting one of the mobile communication devices 102(1)-102(43) has. If in step 1132 the requesting one of the mobile communication devices 102(1)-102(43) determines the number of hops to reach the one of the mobile communication devices 102(1)-102(43) designated as the cluster head in the corresponding one of the clusters 104(1)-104(4) is not better, then the No branch is taken to step 1134. In step 1134, the requesting one of the mobile communication devices 102(1)-102(43) ignores the opportunity to re-join through this new sending one of the mobile communication devices 102(1)-102(43). If in step 1132 the requesting one of the mobile communication devices 102(1)-102(43) determines the number of hops to reach the one of the mobile communication devices 102(1)-102(43) designated as the cluster head in the corresponding one of the clusters 104(1)-104(4) is better, then the Yes branch is taken to step 1136. In step 1136, the requesting one of the mobile communication devices 102(1)-102(43) sends a join request to the one of the mobile communication devices 102(1)-102(43) designated as the cluster head in the corresponding one of the clusters 104(1)-104(4).

Figure 13:
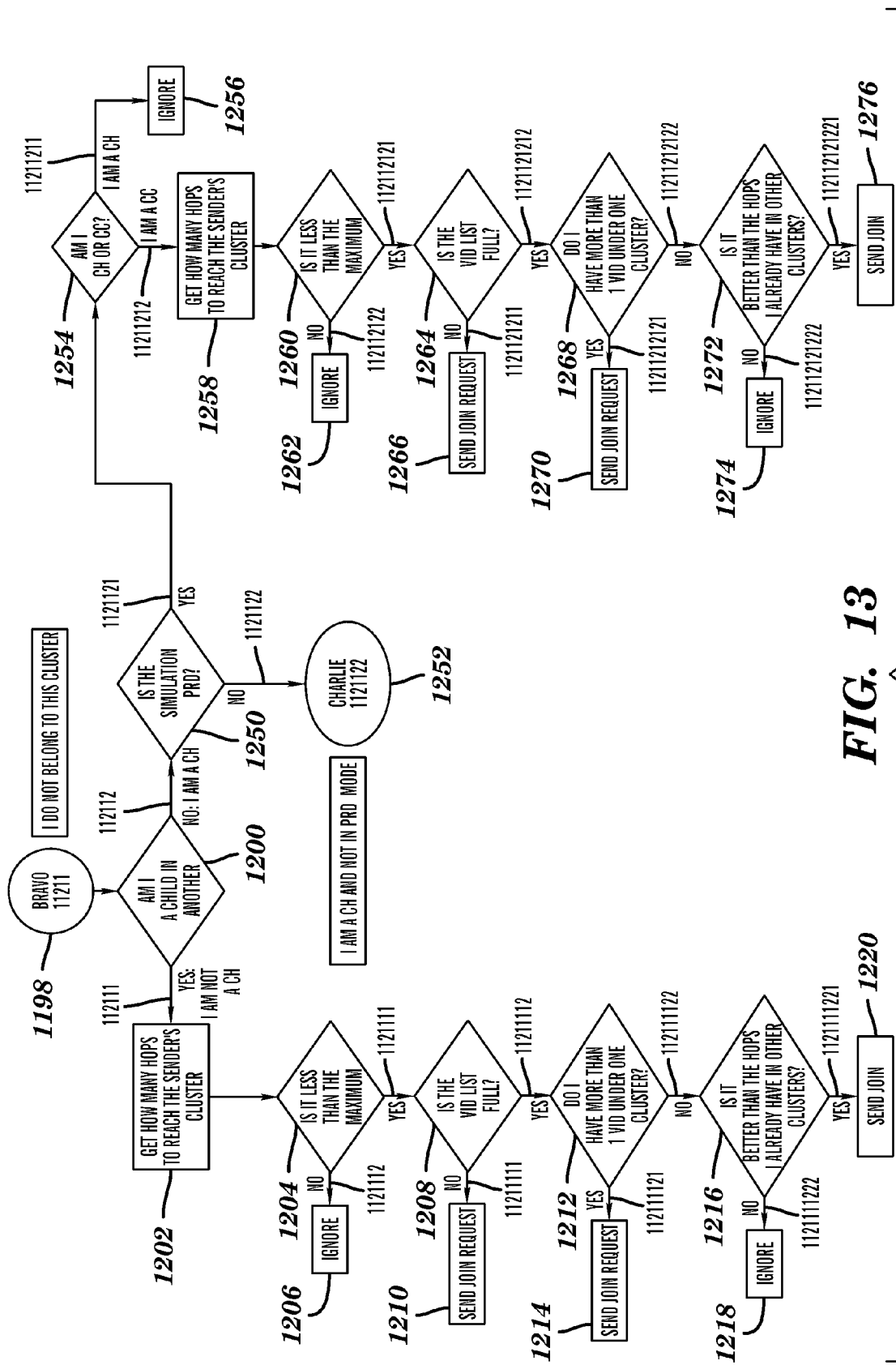

Referring to FIG. 13, a flowchart of another example of a method for determining if one of the mobile communication devices 102(1)-102(43) can join one of the clusters 104(1)-104(4) it is not already a member of is illustrated. In step 1200, a requesting one of the mobile communication devices 102(1)-102(43) determines if it is a child of another one of the mobile communication devices 102(1)-102(43). If in step 1200 the requesting one of the mobile communication devices 102(1)-102(43) determines it is a child of another one of the mobile communication devices 102(1)-102(43), then the Yes branch is taken to step 1202. In step 1202, since the requesting one of the mobile communication devices 102(1)-102(43) is a child of another one of the mobile communication devices 102(1)-102(43) and as a result is not a cluster head. Accordingly, as a child the requesting one of the mobile communication devices 102(1)-102(43) determines how many hops are needed to reach the one of the clusters 104(1)-104(4) with the sending one of the mobile communication devices 102(1)-102(43).

In step 1204, the requesting one of the mobile communication devices 102(1)-102(43) determines if the number of hops to reach the one of the clusters 104(1)-104(4) with the sending one of the mobile communication devices 102(1)-102(43) is less than the maximum limit for one of the clusters 104(1)-104(4). In these embodiments, the maximum limit is based on a set maximum available bandwidth, maximum cluster size, and maximum number of hops to the cluster head, although other types and numbers of parameters could be used for the maximum limit. If in step 1204 the requesting one of the mobile communication devices 102(1)-102(43) determines the number of hops to reach the one of the clusters 104(1)-104(4) with the sending one of the mobile communication devices 102(1)-102(43) is not less than the maximum limit, then the No branch is taken to step 1206. In step 1206, the requesting one of the mobile communication devices

102(1)-102(43) ignores the opportunity to join one of the clusters 104(1)-104(4). If in step 1204 the requesting one of the mobile communication devices 102(1)-102(43) determines the number of hops to reach the one of the clusters 104(1)-104(4) with the sending one of the mobile communication devices 102(1)-102(43) is less than the maximum limit, then the Yes branch is taken to step 1208.

In step 1208, the requesting one of the mobile communication devices 102(1)-102(43) determines if the list of virtual identifiers stored in its memory is full. The maximum size of this list can vary based on a number of factors, such as the particular application and mobile communication devices. If in step 1208 the requesting one of the mobile communication devices 102(1)-102(43) determines the list is not full, then the No branch is taken to step 1210. In step 1210, the requesting one of the mobile communication devices 102(1)-102(43) sends a join request to the sending one of the mobile communication devices 102(1)-102(43), e.g. the one designated as the cluster head, which provided the configuration data. If in step 1210 the requesting one of the mobile communication devices 102(1)-102(43) determines the list is full, then the Yes branch is taken to step 1212.

In step 1212, the requesting one of the mobile communication devices 102(1)-102(43) determines if it has more than one virtual identifier under one of the clusters 104(1)-104(4). If in step 1212 the requesting one of the mobile communication devices 102(1)-102(43) determines it has more than one virtual identifier under one of the clusters 104(1)-104(4), then the Yes branch is taken to step 1214. In step 1214, the requesting one of the mobile communication devices 102(1)-102(43) sends the join request to the sending one of the mobile communication devices 102(1)-102(43), e.g. the one designated as the cluster head, which provided the configuration data. If in step 1212 the requesting one of the mobile communication devices 102(1)-102(43) determines it does not have more than one virtual identifier under one of the clusters 104(1)-104(4), then the No branch is taken to step 1216.

In step 1216, the requesting one of the mobile communication devices 102(1)-102(43) determines if the new opportunity to join has a better connection, such as fewer hops than the hops it already has with another virtual identifier by way of example, although other types and numbers of factors for determining a better connection can be used. If in step 1216 the requesting one of the mobile communication devices 102(1)-102(43) determines the new opportunity to join is not better than the hops it already with the existing virtual identifiers, then the No branch is taken to step 1218. In step 1218, the requesting one of the mobile communication devices 102(1)-102(43) ignores the join opportunity. If in step 1216 the requesting one of the mobile communication devices 102(1)-102(43) determines the new join opportunity is better than the hops it already with at least one of the existing virtual identifiers, then the Yes branch is taken to step 1220. In step 1220, the requesting one of the mobile communication devices 102(1)-102(43) sends a join request to the sending one of the mobile communication devices 102(1)-102(43), e.g. the one designated as the cluster head, which provided the configuration data.

If back in step 1200 the requesting one of the mobile communication devices 102(1)-102(43) determines it is not a child of another one of the mobile communication devices 102(1)-102(43), then the No branch is taken to step 1250. This branch of the method is followed when the requesting one of the mobile communication devices 102(1)-102(43) has an opportunity to join one of the clusters 104(1)-104(4) that it is not a member of and it is a cluster head of another one of the clusters 104(1)-104(4).

In step 1250, the requesting one of the mobile communication devices 102(1)-102(43) determines if the simulation is in a privileged operation mode. If in step 1250 the requesting one of the mobile communication devices 102(1)-102(43) determines the simulation is not in a privileged operation mode, then the No branch is taken to step 1252 which proceeds to another example of a method for determining if one of the mobile communication devices 102(1)-102(43) can join one of the clusters 104(1)-104(4) it is not already a member of and is not a cluster head for any other cluster as illustrated and described in greater detail with respect to FIG. 14. If in step 1250 the requesting one of the mobile communication devices 102(1)-102(43) determines the simulation is in a privileged operation mode, then the Yes branch is taken to step 1254.

In step 1254, the requesting one of the mobile communication devices 102(1)-102(43) determines if it is a cluster head. If in step 1254 the requesting one of the mobile communication devices 102(1)-102(43) determines it is a cluster head, then the Yes branch is taken to step 1256. In step 1256, the requesting one of the mobile communication devices 102(1)-102(43) ignores the opportunity to join. If in step 1254 the requesting one of the mobile communication devices 102(1)-102(43) determines it is not the cluster head, then the No branch is taken to step 1258. In step 1258, the requesting one of the mobile communication devices 102(1)-102(43) determines how many hops are needed to reach the one of the clusters 104(1)-104(4) with the sending one of the mobile communication devices 102(1)-102(43).

In step 1260, the requesting one of the mobile communication devices 102(1)-102(43) determines if the number of hops to reach the one of the clusters 104(1)-104(4) with the sending one of the mobile communication devices 102(1)-102(43) is less than the maximum limit for one of the clusters 104(1)-104(4). In these embodiments, the maximum limit is based on a set maximum available bandwidth, maximum cluster size, and maximum number of hops to the cluster head, although other types and numbers of parameters could be used for the maximum limit. If in step 1260 the requesting one of the mobile communication devices 102(1)-102(43) determines the number of hops to reach the one of the clusters 104(1)-104(4) with the sending one of the mobile communication devices 102(1)-102(43) is not less than the maximum limit, then the No branch is taken to step 1262. In step 1262, the requesting one of the mobile communication devices 102(1)-102(43) ignores the opportunity to join one of the clusters 104(1)-104(4). If in step 1260 the requesting one of the mobile communication devices 102(1)-102(43) determines the number of hops to reach the one of the clusters 104(1)-104(4) with the sending one of the mobile communication devices 102(1)-102(43) is less than the maximum limit, then the Yes branch is taken to step 1264.

In step 1264, the requesting one of the mobile communication devices 102(1)-102(43) determines if the list of virtual identifiers stored in its memory is full. The maximum size of this list can vary based on a number of factors, such as the particular application and mobile communication devices. If in step 1264 the requesting one of the mobile communication devices 102(1)-102(43) determines the list is not full, then the No branch is taken to step 1266. In step 1266, the requesting one of the mobile communication devices 102(1)-102(43) sends a join request to the sending one of the mobile communication devices 102(1)-102(43), e.g. the one designated as the cluster head, which provided the configuration data. If in step 1264 the requesting one of the mobile communication devices 102(1)-102(43) determines the list is full, then the Yes branch is taken to step 1268.

In step 1268, the requesting one of the mobile communication devices 102(1)-102(43) determines if it has more than one virtual identifier under one of the clusters 104(1)-104(4). If in step 1268 the requesting one of the mobile communication devices 102(1)-102(43) determines it has more than one virtual identifier under one of the clusters 104(1)-104(4), then the Yes branch is taken to step 1270. In step 1270, the requesting one of the mobile communication devices 102(1)-102(43) sends the join request to the sending one of the mobile communication devices 102(1)-102(43), e.g. the one designated as the cluster head, which provided the configuration data. If in step 1268 the requesting one of the mobile communication devices 102(1)-102(43) determines it does not have more than one virtual identifier under one of the clusters 104(1)-104(4), then the No branch is taken to step 1272.

In step 1272, the requesting one of the mobile communication devices 102(1)-102(43) determines if the new opportunity to join has a better connection, such as fewer hops than the hops it already has with another virtual identifier by way of example, although other types and numbers of factors for determining a better connection can be used. If in step 1272 the requesting one of the mobile communication devices 102(1)-102(43) determines the new opportunity to join is not better than the hops it already with the existing virtual identifiers, then the No branch is taken to step 1274. In step 1274, the requesting one of the mobile communication devices 102(1)-102(43) ignores the join opportunity. If in step 1272 the requesting one of the mobile communication devices 102(1)-102(43) determines the new join opportunity is better than the hops it already with at least one of the existing virtual identifiers, then the Yes branch is taken to step 1276. In step 1276, the requesting one of the mobile communication devices 102(1)-102(43) sends a join request to the sending one of the mobile communication devices 102(1)-102(43), e.g. the one designated as the cluster head, which provided the configuration data Referring to FIG. 14, a flowchart of yet another example of a method for determining if one of the mobile communication devices 102(1)-102(43) can join one of the clusters 104(1)-104(4) it is not already a member of, is not a cluster head for any other cluster, and the simulation is not in the privileged mode is illustrated. In step 1300, the requesting one of the mobile communication devices 102(1)-102(43) determines if the sending one of the mobile communication devices 102(1)-102(43) is a child in the same one of the clusters 104(1)-104(4). If in step 1300 the requesting one of the mobile communication devices 102(1)-102(43) determines the sending one of the mobile communication devices 102(1)-102(43) is a child in the same one of the clusters 104(1)-104(4), then the Yes branch is taken to step 1302. In step 1302, the requesting one of the mobile communication devices 102(1)-102(43) determines how many hops are needed to reach the one of the clusters 104(1)-104(4) with the sending one of the mobile communication devices 102(1)-102(43).

In step 1304, the requesting one of the mobile communication devices 102(1)-102(43) determines if the number of hops to reach the one of the clusters 104(1)-104(4) with the sending one of the mobile communication devices 102(1)-102(43) is less than the maximum limit for one of the clusters 104(1)-104(4). In these embodiments, the maximum limit is based on a set maximum available bandwidth, maximum cluster size, and maximum number of hops to the cluster head, although other types and numbers of parameters could be used for the maximum limit. If in step 1304 the requesting one of the mobile communication devices 102(1)-102(43) determines the number of hops to reach the one of the clusters 104(1)-104(4) with the sending one of the mobile communication devices 102(1)-102(43) is not less than the maximum limit, then the No branch is taken to step 1306. In step 1306, the requesting one of the mobile communication devices 102(1)-102(43) ignores the opportunity to join one of the clusters 104(1)-104(4). If in step 1304 the requesting one of the mobile communication devices 102(1)-102(43) determines the number of hops to reach the one of the clusters 104(1)-104(4) with the sending one of the mobile communication devices 102(1)-102(43) is less than the maximum limit, then the Yes branch is taken to step 1308.

In step 1308, the requesting one of the mobile communication devices 102(1)-102(43) determines if the cluster size of the one of the clusters 104(1)-104(4) with the sending one of the mobile communication devices 102(1)-102(43) is bigger than its own. If in step 1308 the requesting one of the mobile communication devices 102(1)-102(43) determines the cluster size of the one of the clusters 104(1)-104(4) with the sending one of the mobile communication devices 102(1)-102(43) is not bigger than its own, then the No branch is taken to step 1310. In step 1310, the requesting one of the mobile communication devices 102(1)-102(43) ignores the opportunity to join another one of the clusters 104(1)-104(4). If in step 1308 the requesting one of the mobile communication devices 102(1)-102(43) determines the cluster size of the one of the clusters 104(1)-104(4) with the sending one of the mobile communication devices 102(1)-102(43) is bigger than its own, then the Yes branch is taken to step 1312. In step 1312, the requesting one of the mobile communication devices 102(1)-102(43) sends a join request to the sending one of the mobile communication devices 102(1)-102(43), e.g. the one designated as the cluster head, which provided the configuration data.

If back in step 1300 the requesting one of the mobile communication devices 102(1)-102(43) determines the sending one of the mobile communication devices 102(1)-102(43) is not a child in the same one of the clusters 104(1)-104(4), then the No branch is taken to step 1350. This branch of the method is followed when both the sending one of the mobile communication devices 102(1)-102(43) of the configuration message and the requesting one of the mobile communication devices 102(1)-102(43) are both cluster heads.

In step 1350, the requesting one of the mobile communication devices 102(1)-102(43) determines if the size of the one of the clusters 104(1)-104(4) it is in and the cluster size of the one of the clusters 104(1)-104(4) with the sending one of the mobile communication devices 102(1)-102(43) are both equal to one. If both the sending one of the mobile communication devices 102(1)-102(43) of the configuration message and the requesting one of the mobile communication devices 102(1)-102(43) are equal to one then both are each by themselves a single member of their own clusters. If in step 1350 the requesting one of the mobile communication devices 102(1)-102(43) determines both cluster sizes are not one, then the No branch is taken to step 1352.

In step 1352, the requesting one of the mobile communication devices 102(1)-102(43) determines if the size of the one of the clusters 104(1)-104(4) with the sending one of the mobile communication devices 102(1)-102(43) is bigger than or equal to its own cluster size. If in step 1352 the requesting one of the mobile communication devices 102(1)-102(43) determines the size of the one of the clusters 104(1)-104(4) with the sending one of the mobile communication devices 102(1)-102(43) is bigger, then the Yes branch is taken to step 1354. In step 1354, the requesting one of the mobile communication devices 102(1)-102(43) sends a join request to the sending one of the mobile communication devices 102(1)-102(43). If in step 1352 the requesting one of the mobile communication devices 102(1)-102(43) determines the cluster size of the one of the clusters 104(1)-104(4) with the sending one of the mobile communication devices 102(1)-102(43) is not bigger, then the No branch is taken to step 1356. In step 1356, the requesting one of the mobile communication devices 102(1)-102(43) ignores this opportunity to join another one of the clusters 104(1)-104(4).

If back in step 1350 the requesting one of the mobile communication devices 102(1)-102(43) determines both are singles, then the Yes branch is taken to step 1358. This branch of the method is followed when the opportunity to join is for two single member clusters which are cluster heads in their respective single member clusters. Accordingly a determination needs to be made between both on which becomes the designated as the cluster head. In these particular embodiments, the tiebreaker is based on an arbitrary Unique ID (UID) assigned to each of the mobile communication devices 102(1)-102(43), although other manners for making this determination can be used.

In step 1358, the requesting one of the mobile communication devices 102(1)-102(43) determines if the unique identifier of the sending one of the mobile communication devices 102(1)-102(43) is lower than its own. If in step 1358 the requesting one of the mobile communication devices 102(1)-102(43) determines the unique identifier of the sending one of the mobile communication devices 102(1)-102(43) is lower than its own, then the Yes branch is taken to step 1360. In step 1360, the requesting one of the mobile communication devices 102(1)-102(43) sends the join request making the sending one of the mobile communication devices 102(1)-102(43) the designated cluster head. If in step 1358 the requesting one of the mobile communication devices 102(1)-102(43) determines the unique identifier of the sending one of the mobile communication devices 102(1)-102(43) is not lower than its own, then the No branch is taken to step 1362. In step 1362, the requesting one of the mobile communication devices 102(1)-102(43) ignores this join opportunity. As a result, the requesting one of the mobile communication devices 102(1)-102(43) remains designated as the cluster head in one of the clusters 104(1)-104(4). Eventually, the sending one of the mobile communication devices 102(1)-102(43) will receive an opportunity to join and will act on that.

Figure 15:
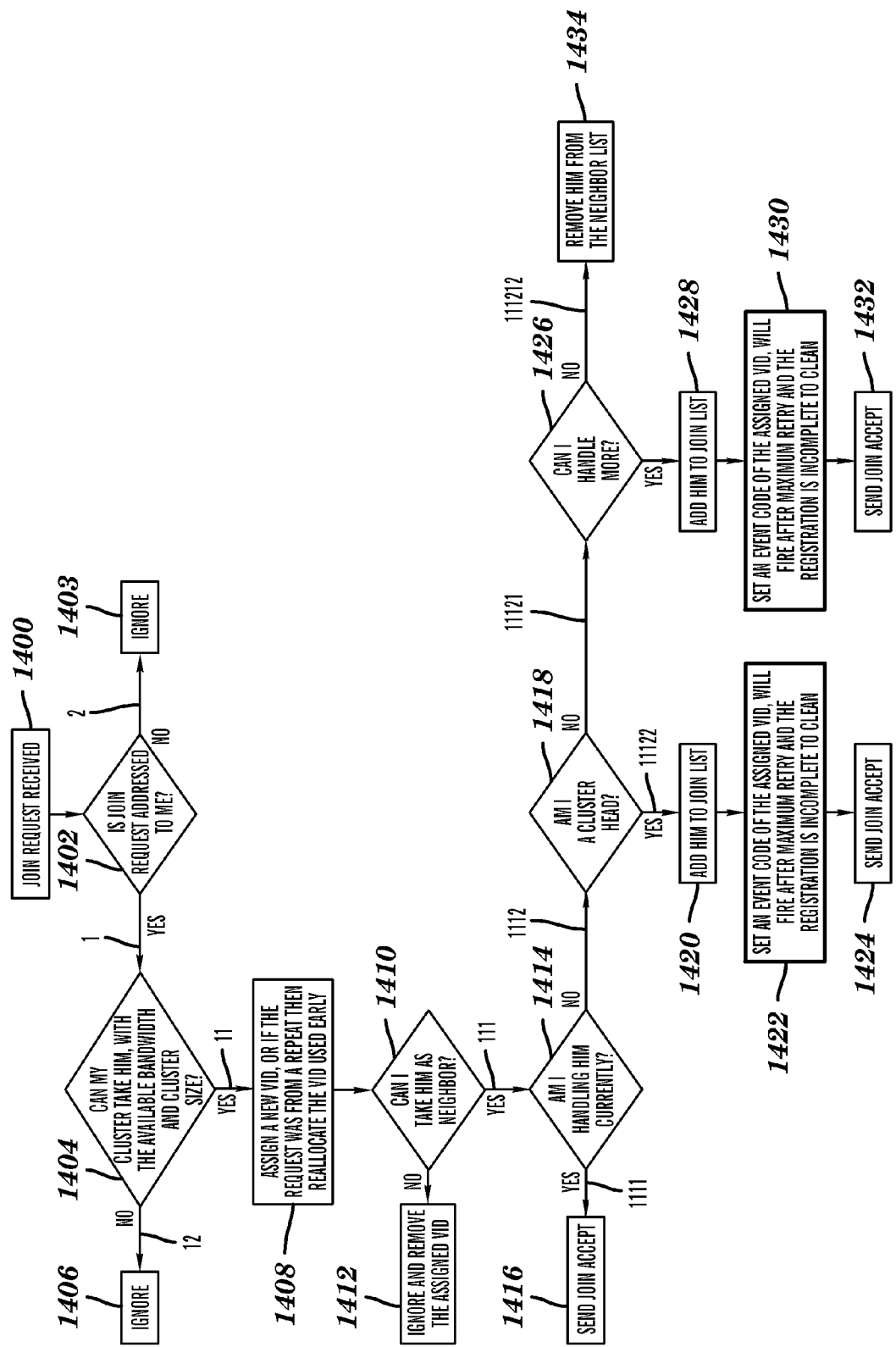
FIG. 15 is a flowchart of another example of a method for determining if a mobile communication device can join a cluster.

Referring to FIG. 15, a flowchart of another example of a method for determining if one of the mobile communication devices 102(1)-102(43) can join one of the clusters 104(1)-104(4) is illustrated. In step 1400, one of the mobile communication devices 102(1)-102(43) receives a join request from another one of the mobile communication devices 102(1)-102(43). In step 1402, the one of the mobile communication devices 102(1)-102(43) receiving the join request determines if the join request is addressed to itself. If in step 1402 the one of the mobile communication devices 102(1)-102(43) receiving the join request determines the join request is not addressed to itself, then the No branch is taken to step 1403. In step 1403, the one of the mobile communication devices 102(1)-102(43) receiving the join request ignores the join request. If in step 1402 the one of the mobile communication devices 102(1)-102(43) receiving the join request determines the join request is addressed to itself, then the Yes branch is taken to step 1404.

In step 1404, the one of the mobile communication devices 102(1)-102(43) receiving the join request determines if it can accept the request based on a set maximum available bandwidth and maximum cluster size for the one of the clusters 104(1)-104(4) the requesting one of the mobile communication devices 102(1)-102(43) has been asked to join, although other types and numbers of parameters can be used. The one of the mobile communication devices 102(1)-102(43) designated as the cluster head in the corresponding one of the clusters 104(1)-104(4) maintains these parameters and these are distributed to every one of the mobile communication devices 102(1)-102(43) in the clusters 104(1)-104(4) so they know how to respond to a join request. If in step 1404 the one of the mobile communication devices 102(1)-102(43) receiving the join request determines the one of the clusters 104(1)-104(4) cannot take on another member because it can not meet one or more set parameters, such as insufficient available bandwidth or the one of the clusters 104(1)-104(4) is already at its maximum size, then the No branch is taken to step 1406. In step 1406, the one of the mobile communication devices 102(1)-102(43) receiving the join request ignores the join request. If in step 1404 the one of the mobile communication devices 102(1)-102(43) receiving the join request determines the one of the clusters 104(1)-104(4) can take on another member, then the Yes branch is taken to step 1408. In step 1408, the one of the mobile communication devices 102(1)-102(43) receiving the join request assigns a new virtual identifier, or if the request was from a repeat member, then one of the mobile communication devices 102(1)-102 (43) reallocates the virtual identifier used early.

In step 1410, the one of the mobile communication devices 102(1)-102(43) receiving the join request determines if it can take on the sending one of the mobile communication devices 102(1)-102(43) as a neighbor. If in step 1410 the one of the mobile communication devices 102(1)-102(43) receiving the join request determines it cannot take on the sending one of the mobile communication devices 102(1)-102(43) as a neighbor, then the No branch is taken to step 1412. In step 1412, the one of the mobile communication devices 102(1)-102(43) receiving the join request ignores the request and removes the assigned virtual identifier. If in step 1410 the one of the mobile communication devices 102(1)-102(43) receiving the join request determines it can take on the sending one of the mobile communication devices 102(1)-102(43) as a neighbor, then the Yes branch is taken to step 1414.

In step 1414, the one of the mobile communication devices 102(1)-102(43) receiving the join request determines if it is currently handling the sending one of the mobile communication devices 102(1)-102(43). If in step 1414 the one of the mobile communication devices 102(1)-102(43) receiving the join request determines it is currently handling the sending one of the mobile communication devices 102(1)-102(43), then the Yes branch is taken to step 1416. In step 1416, the one of the mobile communication devices 102(1)-102(43) receiving the join request sends a join accept. If in step 1414 the one of the mobile communication devices 102(1)-102(43) receiving the join request determines it is not currently handling the sending one of the mobile communication devices 102(1)-102(43), then the No branch is taken to step 1418.

In step 1418, the one of the mobile communication devices 102(1)-102(43) receiving the join request determines if it is a cluster head. If the one of the mobile communication devices 102(1)-102(43) receiving the join request determines it is a cluster head, then the Yes branch is taken to step 1420. In step 1420, the one of the mobile communication devices 102(1)-102(43) receiving the join request adds the sending one of the mobile communication devices 102(1)-102(43) to a join list for processing by the one of the mobile communication devices 102(1)-102(43) designated as the cluster head in the corresponding one of the clusters 104(1)-104(4). In step 1422, the one of the mobile communication devices 102(1)-102(43) designated as the cluster head in the corresponding one of the clusters 104(1)-104(4) sets an event based on a timer for a set period of time to retry a set number of times if no response is received. The method for monitoring and managing this event is illustrated and described in greater detail with reference to FIGS. 3A and 3B. In step 1424, the one of the mobile communication devices 102(1)-102(43) designated as the cluster head in the corresponding one of the clusters 104(1)-104(4) sends a join accept.

If back in step 1418 the one of the mobile communication devices 102(1)-102(43) receiving the join request determines it is not a cluster head, then the No branch is taken to step 1426. In step 1426, the one of the mobile communication devices 102(1)-102(43) receiving the join request and which is not a cluster head determines if it can handle the transfer of more join requests to the one of the mobile communication devices 102(1)-102(43) designated as the cluster head in the corresponding one of the clusters 104(1)-104(4). If in step 1426 the one of the mobile communication devices 102(1)-102(43) receiving the join request determines it can handle more request transfers, then the Yes branch is taken to step 1428. In step 1428, the one of the mobile communication devices 102(1)-102(43) receiving the join request adds request to its join request list. In step 1430, the one of the mobile communication devices 102(1)-102(43) designated as the cluster head in the corresponding one of the clusters 104(1)-104(4) sets an event based on a timer for a set period of time to retry a set number of times if no response is received. The method for monitoring and managing this event is illustrated and described in greater detail with reference to FIGS. 3A and 3B. In step 1432, the one of the mobile communication devices 102(1)-102(43) receiving the join request sends a join accept message.

If the one of the mobile communication devices 102(1)-102(43) receiving the join request determines in step 1428 that it cannot handle the transfer of more requests, then the No branch is taken to step 1434. In step 1434, the one of the mobile communication devices 102(1)-102(43) receiving the join request removes the virtual identifier of the sending one of the mobile communication devices 102(1)-102(43) from its neighbor list.

Figure 16:
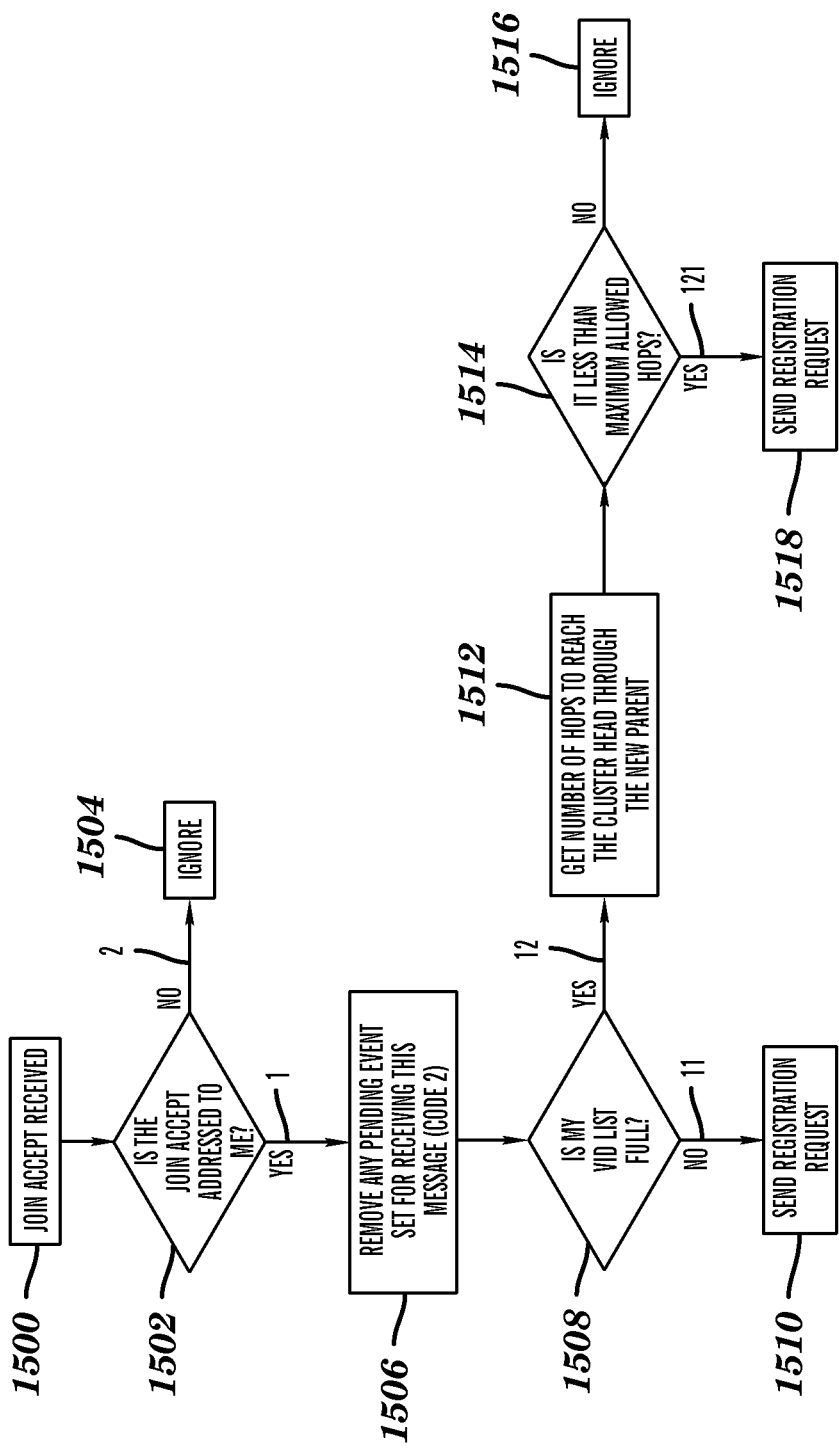
FIG. 16 is a flowchart of an example of a method for processing an acceptance of a mobile communication device to join a cluster.

Referring to FIG. 16, a flowchart of an example of a method for processing an acceptance of one of the mobile communication devices 102(1)-102(43) to join one of the clusters 104(1)-104(4) is illustrated. In step 1500, one of the mobile communication devices 102(1)-102(43) receives a join accept. In step 1502, the one of the mobile communication devices 102(1)-102(43) receiving the join accept determines if the join accept is addressed to itself. If in step 1502 the one of the mobile communication devices 102(1)-102(43) receiving the join accept determines the join accept is not addressed to itself, then the No branch is taken to step 1504. In step 1504, the one of the mobile communication devices 102(1)-102(43) receiving the join accept ignores the join accept. If in step 1502 the one of the mobile communication devices 102(1)-102(43) receiving the join accept determines the join accept is addressed to itself, then the Yes branch is taken to step 1506. In step 1506, the one of the mobile communication devices 102(1)-102(43) receiving the join accept removes any pending event set for receiving this message, which was set up to time out on no reply as set forth in the method illustrated and described in greater detail with reference to FIGS. 3A-3B. Since the reply has now been received, the timeout event can be cleared.

In step 1508, the one of the mobile communication devices 102(1)-102(43) receiving the join accept determines if its virtual identifier list full. If in step 1508 the one of the mobile communication devices 102(1)-102(43) receiving the join accept determines the list is not full, then the No branch is taken to step 1510. In step 1510, the one of the mobile communication devices 102(1)-102(43) receiving the join accept sends a registration request. If in step 1508 the one of the mobile communication devices 102(1)-102(43) receiving the join accept determines its list is full, then the Yes branch is taken to step 1512. In step 1512, the one of the mobile communication devices 102(1)-102(43) receiving the join accept determines a number of hops to reach the one of the mobile communication devices 102(1)-102(43) designated as the cluster head in the corresponding one of the clusters 104(1)-104(4) through the new parent.

In step 1514, the one of the mobile communication devices 102(1)-102(43) receiving the join accept determines if the number of hops is less than a maximum allowed number of hops. If in step 1514 the one of the mobile communication devices 102(1)-102(43) receiving the join accept determines the number of hops is not less than the maximum, then the No branch is taken to step 1516. In step 1516, the one of the mobile communication devices 102(1)-102(43) receiving the join accept ignores the join accept. If in step 1514 the one of the mobile communication devices 102(1)-102(43) receiving the join accept determines the number of hops is less than the maximum allowed number of hops, then the Yes branch is taken to step 1518. In step 1518, the one of the mobile communication devices 102(1)-102(43) receiving the join accept sends a registration request.

Figure 17:
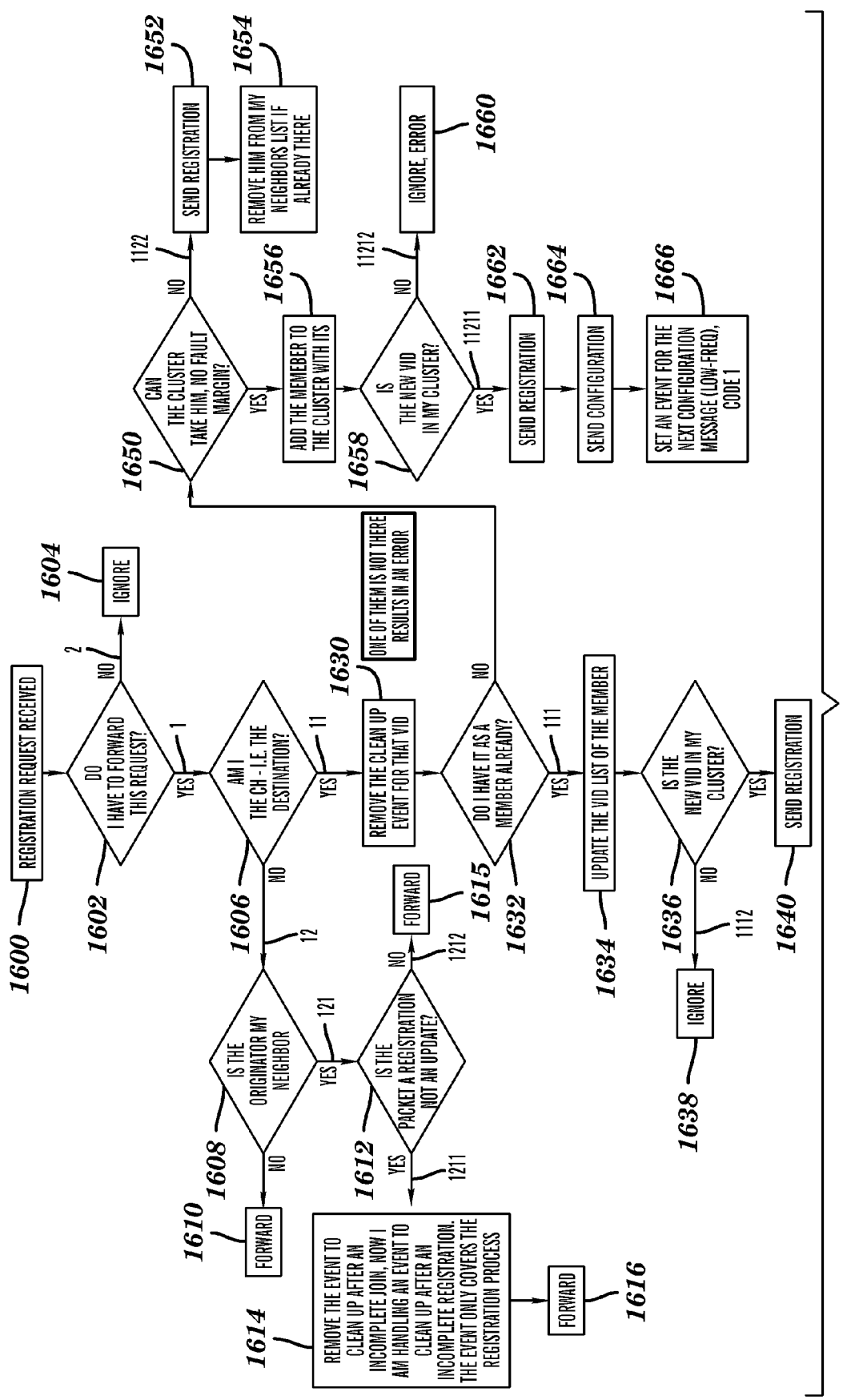
FIG. 17 is a flowchart of an example of a method for processing a received registration request from a mobile communication device.

Referring to FIG. 17, a flowchart of an example of a method for processing a received registration request from one of the mobile communication devices 102(1)-102(43) is illustrated. In step 1600, one of the mobile communication devices 102(1)-102(43) receives a registration request. In step 1602, the one of the mobile communication devices 102(1)-102(43) receiving the registration request determines if it needs to forward this request up the tree structure to the one of the mobile communication devices 102(1)-102(43) designated as the cluster head in the corresponding one of the clusters 104(1)-104(4). If in step 1602 the one of the mobile communication devices 102(1)-102(43) receiving the registration request determines it does not need to forward this request, then the No branch is taken to step 1604. In step 1604, the one of the mobile communication devices 102(1)-102(43) receiving the registration request ignores the registration request. If in step 1602 the one of the mobile communication devices 102(1)-102(43) receiving the registration request determines it needs to forward this request, then the Yes branch is taken to step 1606. This step ensures the data in the request will eventually reach the one of the mobile communication devices 102(1)-102(43) designated as the cluster head in the corresponding one of the clusters 104(1)-104(4).

In step 1606, the one of the mobile communication devices 102(1)-102(43) receiving the registration request determines if it is the one of the mobile communication devices 102(1)-102(43) designated as the cluster head in the corresponding one of the clusters 104(1)-104(4). If in step 1606 the one of the mobile communication devices 102(1)-102(43) receiving the registration request is not the one of the mobile communication devices 102(1)-102(43) designated as the cluster head in the corresponding one of the clusters 104(1)-104(4), then the No branch is taken to step 1608.

In step 1608, the one of the mobile communication devices 102(1)-102(43) receiving the registration request determines if the originator is a neighbor. If in step 1608 the one of the mobile communication devices 102(1)-102(43) receiving the registration request determines the originator is not a neighbor, then the No branch is taken to step 1610. In step 1610, the one of the mobile communication devices 102(1)-102(43) receiving the registration request forwards the registration request up the tree structure for one of the clusters 104(1)-104(4). If in step 1608 the one of the mobile communication devices 102(1)-102(43) receiving the registration request determines the originator is a neighbor, then the Yes branch is taken to step 1612.

In step 1612, the one of the mobile communication devices 102(1)-102(43) receiving the registration request determines if the packet is truly a new registration request and not just a registration update. If in step 1612 the one of the mobile communication devices 102(1)-102(43) receiving the registration request determines the packet is a new registration, then the Yes branch is taken to step 1614. In step 1614, the one of the mobile communication devices 102(1)-102(43) receiving the registration request removes the timer interrupt event to clean up after an incomplete join. The registration request is the proper response to a join accept, so the registration process is proceeding properly. If in step 1612 the one of the mobile communication devices 102(1)-102(43) receiving the registration request determines the packet is not a new registration request, but rather just an update, then the No branch is taken to step 1615. In step 1615, the one of the mobile communication devices 102(1)-102(43) receiving the registration request forwards the registration update message up the tree structure of one of the clusters 104(1)-104(4) to the one of the mobile communication devices 102(1)-102(43) designated as the cluster head in the corresponding one of the clusters 104(1)-104(4).

If back in step 1606 the one of the mobile communication devices 102(1)-102(43) receiving the registration request is the one of the mobile communication devices 102(1)-102(43) designated as the cluster head in the corresponding one of the clusters 104(1)-104(4), then the Yes branch is taken to step 1630. In step 1630, the one of the mobile communication devices 102(1)-102(43) receiving the registration request removes the clean up event for that virtual identifier. This clears the timer interrupt event that had the one of the mobile communication devices 102(1)-102(43) designated as the cluster head in the corresponding one of the clusters 104(1)-104(4) waiting to receive a registration request. Again the method for monitoring events is illustrated and described in greater detail with reference to FIGS. 3A and 3B.

In step 1632, the one of the mobile communication devices 102(1)-102(43) designated as the cluster head in the corresponding one of the clusters 104(1)-104(4) determines if it already has the requesting one of the mobile communication devices 102(1)-102(43) as a member. If in step 1632 the one of the mobile communication devices 102(1)-102(43) designated as the cluster head in the corresponding one of the clusters 104(1)-104(4) determines the requesting one of the mobile communication devices 102(1)-102(43) is already a member of the same one of the clusters 104(1)-104(4), then the Yes branch is taken to step 1634. In step 1634, the one of the mobile communication devices 102(1)-102(43) designated as the cluster head in the corresponding one of the clusters 104(1)-104(4) updates the virtual identifier list of the member.

In step 1636, the one of the mobile communication devices 102(1)-102(43) designated as the cluster head in the corresponding one of the clusters 104(1)-104(4) determines if the new virtual identifier is in its clusters 104(1)-104(4). If in step 1636 the one of the mobile communication devices 102(1)-102(43) designated as the cluster head in the corresponding one of the clusters 104(1)-104(4) determines the new virtual identifier is not in its clusters 104(1)-104(4), then the No branch is taken to step 1638. This means this is a registration request for one of the mobile communication devices 102(1)-102(43) to join a different one of the clusters 104(1)-104(4) that is already a member of my cluster. In step 1638, the one of the mobile communication devices 102(1)-102(43) designated as the cluster head in the corresponding one of the clusters 104(1)-104(4) ignores the request. If in step 1636 the one of the mobile communication devices 102(1)-102(43) designated as the cluster head in the corresponding one of the clusters 104(1)-104(4) determines the new virtual identifier is in the same one of the clusters 104(1)-104(4), then the Yes branch is taken to step 1640. In step 1640, the one of the mobile communication devices 102(1)-102(43) designated as the cluster head in the corresponding one of the clusters 104(1)-104(4) sends a registration reply acceptance.

If back in step 1632 the one of the mobile communication devices 102(1)-102(43) designated as the cluster head in the corresponding one of the clusters 104(1)-104(4) determines the requesting one of the mobile communication devices 102(1)-102(43) is not a member of the same one of the clusters 104(1)-104(4), then the No branch is taken to step 1650. In step 1650, the one of the mobile communication devices 102(1)-102(43) designated as the cluster head in the corresponding one of the clusters 104(1)-104(4) determines if the one of the clusters 104(1)-104(4) can take on another one of the mobile communication devices 102(1)-102(43) as a member. To get to this point, an initial determination was made by the one of the mobile communication devices 102(1)-102(43) designated as the cluster head in the corresponding one of the clusters 104(1)-104(4) to accept this member when it sent the join accept. This registration request is in reply to that join accept, and so now additional validation and authentication steps are made to allow this one of the mobile communication devices 102(1)-102(43) to register. If in step 1650 the one of the mobile communication devices 102(1)-102(43) designated as the cluster head in the corresponding one of the clusters 104(1)-104(4) determines the one of the clusters 104(1)-104(4) cannot accept this registration, then the No branch is taken to step 1652. In step 1652, the one of the mobile communication devices 102(1)-102(43) designated as the cluster head in the corresponding one of the clusters 104(1)-104(4) sends a registration reply rejecting acceptance. In step 1654, the one of the mobile communication devices 102(1)-102(43) designated as the cluster head in the corresponding one of the clusters 104(1)-104(4) removes this virtual identifier from its list if it is already there. If for some reason, this one of the mobile communication devices 102(1)-102(43) was previously accepted as a member before, it is not valid now because it was just rejected and must be removed.

If in step 1650 the one of the mobile communication devices 102(1)-102(43) designated as the cluster head in the corresponding one of the clusters 104(1)-104(4) determines it can accept this registration, then the Yes branch is taken to step 1656. In step 1656, the one of the mobile communication devices 102(1)-102(43) designated as the cluster head in the corresponding one of the clusters 104(1)-104(4) adds the member to the one of the clusters 104(1)-104(4) and the virtual identifier to its list.

In step 1658, the one of the mobile communication devices 102(1)-102(43) designated as the cluster head in the corresponding one of the clusters 104(1)-104(4) determines if the new virtual identifier is in its one of clusters 104(1)-104(4). If in step 1658 the one of the mobile communication devices 102(1)-102(43) designated as the cluster head in the corresponding one of the clusters 104(1)-104(4) determines the new virtual identifier is not in its one of clusters 104(1)-104(4), then the No branch is taken to step 1660. In step 1660, the one of the mobile communication devices 102(1)-102(43) designated as the cluster head in the corresponding one of the clusters 104(1)-104(4) ignores the registration request and notes an error because this path should not occur.

If in step 1658 the one of the mobile communication devices 102(1)-102(43) designated as the cluster head in the corresponding one of the clusters 104(1)-104(4) determines the new virtual identifier is in its one of the clusters 104(1)-104(4), then the Yes branch is taken to step 1662. In step 1662, the one of the mobile communication devices 102(1)-102(43) designated as the cluster head in the corresponding one of the clusters 104(1)-104(4) sends a registration reply to accept the registration. In step 1664, the one of the mobile communication devices 102(1)-102(43) designated as the cluster head in the corresponding one of the clusters 104(1)-104(4) then sends a new configuration message with the new membership information to the ones of the mobile communication devices 102(1)-102(43) designated as the cluster head in the other ones of the clusters 104(1)-104(4). In step 1666, the one of the mobile communication devices 102(1)-102(43) designated as the cluster head in the corresponding one of the clusters 104(1)-104(4) sets an event for the timer interrupt to queue up for receipt of the next configuration message as illustrated and explained in greater detail with reference to FIGS. 3A and 3B.

Figure 18:
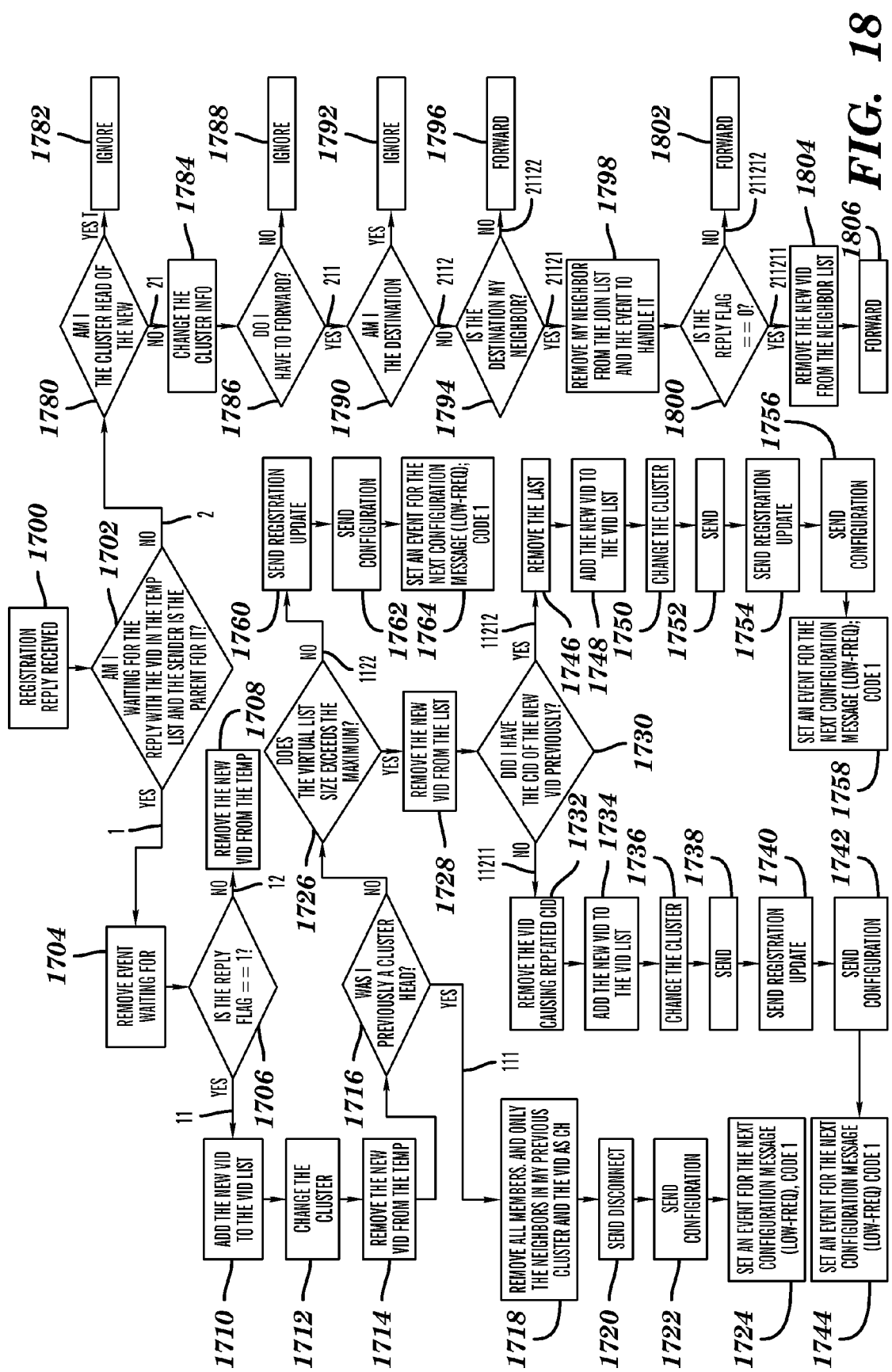
FIG. 18 is a flowchart of an example of a method for processing a reply to a registration request from a mobile communication device.

Referring to FIG. 18, a flowchart of an example of a method for processing a reply to a registration request from one of the mobile communication devices 102(1)-102(43) is illustrated. In step 1700, one of the mobile communication devices 102(1)-102(43) receives a registration reply. In step 1702, the one of the mobile communication devices 102(1)-102(43) receiving the registration reply determines if it is waiting for the reply with the virtual identifier in the temporary list and if it is the parent for it. If the one of the mobile communication devices 102(1)-102(43) receiving the registration reply determines it is the reply it was waiting for, then the Yes branch is taken to step 1704. In step 1704, the one of the mobile communication devices 102(1)-102(43) receiving the registration reply removes the event waiting for registration request from the timer interrupt queue in accordance with the method illustrated and described in greater detail with reference to FIGS. 3A and 3B, since the timeout event for waiting for this reply is no longer needed.

In step 1706, the one of the mobile communication devices 102(1)-102(43) receiving the registration reply determines if the reply flag equals one, which indicates the registration request was accepted. If in step 1706 the one of the mobile communication devices 102(1)-102(43) receiving the registration reply determines the reply flag does not equal one, then the No branch is taken to step 1708. In step 1708, the one of the mobile communication devices 102(1)-102(43) receiving the registration reply removes the new virtual identifier from the temporary virtual identifier list. The one of the mobile communication devices 102(1)-102(43) receiving the registration reply had added this new virtual identifier temporarily pending acceptance, but with the rejection it must be removed. If in step 1706 the one of the mobile communication devices 102(1)-102(43) receiving the registration reply determines the reply flag equals one, then the registration request was accepted and the Yes branch is taken to step 1710.

In step 1710, the one of the mobile communication devices 102(1)-102(43) receiving the registration reply adds the new virtual identifier to the virtual identifier list. In step 1712, the one of the mobile communication devices 102(1)-102(43) receiving the registration reply updates its internal cluster information as it is now a member of a new one of the clusters 104(1)-104(4). In step 1714, the one of the mobile communication devices 102(1)-102(43) receiving the registration reply removes the new virtual identifier from the temporary virtual identifier list since it is now on the active list stored in memory.

In step 1716, the one of the mobile communication devices 102(1)-102(43) receiving the registration reply determines if it previously was a cluster head. If in step 1716 the one of the mobile communication devices 102(1)-102(43) receiving the registration reply determines it previously was a cluster head, then the Yes branch is taken to step 1718. In step 1718, the one of the mobile communication devices 102(1)-102(43) needs to re-establish itself as the new cluster head, since it was one previously. It removes all members from its neighbor list and only the neighbors in its previous cluster and the virtual identifier as cluster head are re-established. In step 1720, the one of the mobile communication devices 102(1)-102(43) which is the new cluster head candidate sends a disconnect message to all of the mobile communication devices 102(1)-102(43) it is dropping. In step 1722, the one of the mobile communication devices 102(1)-102(43) which is the new cluster head candidate sends a configuration message to establish itself as the new cluster head (resuming its role). In step 1724, the one of the mobile communication devices 102(1)-102(43) which is the new cluster head candidate sets an event for the timer interrupt to schedule the next configuration message transmission at the low frequency interval as illustrated and described in greater detail with reference FIGS. 3A and 3B. If in step 1716 the one of the mobile communication devices 102(1)-102(43) receiving the registration reply determines it previously was not a cluster head, then the No branch is taken to step 1726.

In step 1726, the one of the mobile communication devices 102(1)-102(43) receiving the registration reply determines if the size of the list of virtual identifiers in its memory exceeds a maximum cluster size. If in step 1726 the one of the mobile communication devices 102(1)-102(43) receiving the registration reply determines the size of the list exceeds a maximum cluster size, then the Yes branch is taken to step 1728. In step 1728, the one of the mobile communication devices 102(1)-102(43) receiving the registration reply removes the new virtual identifier from the list since the size limit was reached. The new virtual identifier can be added back again later if a less desirable virtual identifier can be found for deletion.

In step 1730, the one of the mobile communication devices 102(1)-102(43) receiving the registration reply determines if it previously had the Cluster ID (CID) of the new virtual identifier. This means it was already a member of this one of the clusters 104(1)-104(4) under a different VID. If in step 1730 the one of the mobile communication devices 102(1)-102(43) receiving the registration reply determines it previously did not have the (CID), then the No branch is taken to step 1732. In step 1732, since a new one of the clusters 104(1)-104(4) is being joined, the one of the mobile communication devices 102(1)-102(43) receiving the registration reply removes the virtual identifier from the list with a repeated CID. This is because it is more desirable to belong to more clusters 104(1)-104(4) than to have several connections to the same one of the clusters 104(1)-104(4). Now there is room in the list, so in step 1734, the new virtual identifier is added from our registration replay to the list of virtual identifiers by the one of the mobile communication devices 102(1)-102(43) receiving the registration reply. In step 1736, the one of the mobile communication devices 102(1)-102(43) receiving the registration reply changes the internal cluster information to reflect the new memberships. In step 1738, the one of the mobile communication devices 102(1)-102(43) receiving the registration reply sends a disconnect message to drop the virtual identifier from any list to the one of the mobile communication devices 102(1)-102(43) designated as a cluster head. In step 1740, the one of the mobile communication devices 102(1)-102(43) designated as the cluster head sends out a registration update message to let the other ones of the mobile communication devices 102(1)-102(43) designated as the cluster heads in the other clusters 104(1)-104(4) know of the change in connections. In step 1744, the one of the mobile communication devices 102(1)-102(43) designated as the cluster head in the corresponding one of the clusters 104(1)-104(4) schedules the next configuration message to occur at the low frequency interval by setting an event as illustrated and described in greater detail with reference to FIGS. 3A and 3B.

If in step 1730, the one of the mobile communication devices 102(1)-102(43) processing the registration reply determines that the Cluster ID (CID) is one it had previously, then the Yes branch is taken to step 1746. In step 1746, the one of the mobile communication devices 102(1)-102(43) processing the registration reply removes the last virtual identifier in its list with this same CID. In step 1748, the one of the mobile communication devices 102(1)-102(43) processing the registration reply also adds the new virtual identifier to the virtual identifier list, so it now has a more current member of this one of the clusters 104(1)-104(4). Then, in step 1750, the one of the mobile communication devices 102(1)-102(43) processing the registration reply updates its internal cluster information to reflect the changed status. In step 1752, the one of the mobile communication devices 102(1)-102(43) processing the registration reply sends a disconnect message to the virtual identifier it removed from its list. In step 1754, the one of the mobile communication devices 102(1)-102(43) processing the registration reply sends a registration update to the one of the mobile communication devices 102(1)-102(43) designated as the cluster head in the corresponding one of the clusters 104(1)-104(4) to indicate the changed status in the cluster information. In step 1756, the one of the mobile communication devices 102(1)-102(43) designated as the cluster head in the corresponding one of the clusters 104(1)-104(4) sends a configuration message out to the all the clusters 104(1)-104(4) to notify all the mobile communication devices 102(1)-102(43) in clusters 104(1)-104(4) of the changed status. In step 1758, the one of the mobile communication devices 102(1)-102(43) designated as the cluster head in the corresponding one of the clusters 104(1)-104(4) sets an event for the timer interrupt to queue up the next configuration message in accordance with the method illustrated and described in greater detail with reference to FIGS. 3A and 3B.

If in step 1726 the one of the mobile communication devices 102(1)-102(43) receiving the registration reply determines the list size does not exceed its maximum, then the No branch is taken to step 1760. In step 1760, the one of the mobile communication devices 102(1)-102(43) receiving the registration reply sends a registration update to the one of the mobile communication devices 102(1)-102(43) designated as the cluster head in the corresponding one of the clusters 104(1)-104(4). In step 1762, the one of the mobile communication devices 102(1)-102(43) designated as the cluster head in the corresponding one of the clusters 104(1)-104(4) sends a configuration message out to all the clusters 104(1)-104(4) to notify all the cluster members of the changed status. In step 1764, the one of the mobile communication devices 102(1)-102(43) designated as the cluster head in the corresponding one of the clusters 104(1)-104(4) sets an event for the timer interrupt to queue up the next configuration message in accordance with the method illustrated and described in greater detail with reference to FIGS. 3A and 3B.

If back in step 1702 the one of the mobile communication devices 102(1)-102(43) receiving the registration reply determines this is not the reply it was waiting for, then the No branch is taken to step 1780. In step 1780, the one of the mobile communication devices 102(1)-102(43) receiving the registration reply determines if it is the one of the mobile communication devices 102(1)-102(43) designated as the cluster head of the new virtual identifier. If in step 1780 the one of the mobile communication devices 102(1)-102(43) receiving the registration reply determines it is the one of the mobile communication devices 102(1)-102(43) designated as the cluster head of the new virtual identifier, then the receiving one of the mobile communication devices 102(1)-102(43) is hearing its own transmitted message and takes the Yes branch is taken to step 1782. In step 1782, the one of the mobile communication devices 102(1)-102(43) receiving the registration reply ignores the registration reply. If in step 1780 the one of the mobile communication devices 102(1)-102(43) receiving the registration reply determines it is not the one of the mobile communication devices 102(1)-102(43) designated as the cluster head of the new virtual identifier, then the No branch is taken to step 1784. In step 1784, the one of the mobile communication devices 102(1)-102(43) receiving the registration reply changes its internal cluster information.

In step 1786, the one of the mobile communication devices 102(1)-102(43) receiving the registration reply determines if it needs to forward the registration reply message, based on the virtual identifier destination address in the message. If in step 1786 the one of the mobile communication devices 102(1)-102(43) receiving the registration reply determines it does not need to forward the message, then the No branch is taken to step 1788. In step 1788 the one of the mobile communication devices 102(1)-102(43) receiving the registration reply ignores the message. If in step 1786 the one of the mobile communication devices 102(1)-102(43) receiving the registration reply determines it does need to forward the message, then the Yes branch is taken to step 1790.

In step 1790, the one of the mobile communication devices 102(1)-102(43) receiving the registration reply determines if it is the destination. If in step 1790 the one of the mobile communication devices 102(1)-102(43) receiving the registration reply determines it is the destination, then the Yes branch is taken to step 1792. In step 1792, the one of the mobile communication devices 102(1)-102(43) receiving the registration reply ignores the message. Actually, the message has been already processed as the internal cluster information was updated in step 1784 and no more processing required so the message can now be ignored. If in step 1790 the one of the mobile communication devices 102(1)-102(43) receiving the registration reply determines it is not the destination, then the No branch is taken to step 1794.

In step 1794, the one of the mobile communication devices 102(1)-102(43) receiving the registration reply determines if the destination is to its nearest neighbor. If in step 1794 the one of the mobile communication devices 102(1)-102(43) receiving the registration reply determines the destination is not to its nearest neighbor, then the No branch is taken to step 1796. In step 1796, the one of the mobile communication devices 102(1)-102(43) receiving the registration reply forwards the registration reply message down the tree to the one of the mobile communication devices 102(1)-102(43) which is the destination of the message. If in step 1794 the one of the mobile communication devices 102(1)-102(43) receiving the registration reply determines the destination is to its nearest neighbor, then the Yes branch is taken to step 1798. This means the one of the mobile communication devices 102(1)-102(43) which is the destination is a child and is joining the list of children for the one of the mobile communication devices 102(1)-102(43) receiving the registration reply. Though this point in processing is reach if a registration reply was not expected, the registration process may have started through a different route or been interrupted. In step 1798, the one of the mobile communication devices 102(1)-102(43) receiving the registration reply removes the virtual identifier of the neighbor from the join list, if it is present, and removes the event in case one was pending in accordance with the method illustrated and described in greater detail with reference to FIGS. 3A and 3B.

In step 1800, he one of the mobile communication devices 102(1)-102(43) receiving the registration reply determines if the registration request was rejected and one of the mobile communication devices 102(1)-102(43) cannot join one of the clusters 104(1)-104(4). If in step 1800 the one of the mobile communication devices 102(1)-102(43) receiving the registration reply determines the registration request was not rejected, then the No branch is taken to step 1802. In step 1802, the one of the mobile communication devices 102(1)-102(43) receiving the registration reply forwards the registration accept message. If in step 1800 the one of the mobile communication devices 102(1)-102(43) receiving the registration reply determines the registration request was rejected, then the Yes branch is taken to step 1804. In step 1804, the one of the mobile communication devices 102(1)-102(43) receiving the registration reply removes the new virtual identifier from the neighbor list, since the registration request was rejected. In step 1806, the one of the mobile communication devices 102(1)-102(43) receiving the registration reply forwards registration reject reply to the one of the mobile communication devices 102(1)-102(43) which is the destination so it knows it was not accepted into the one of the clusters 104(1)-104(4).

Figure 19:
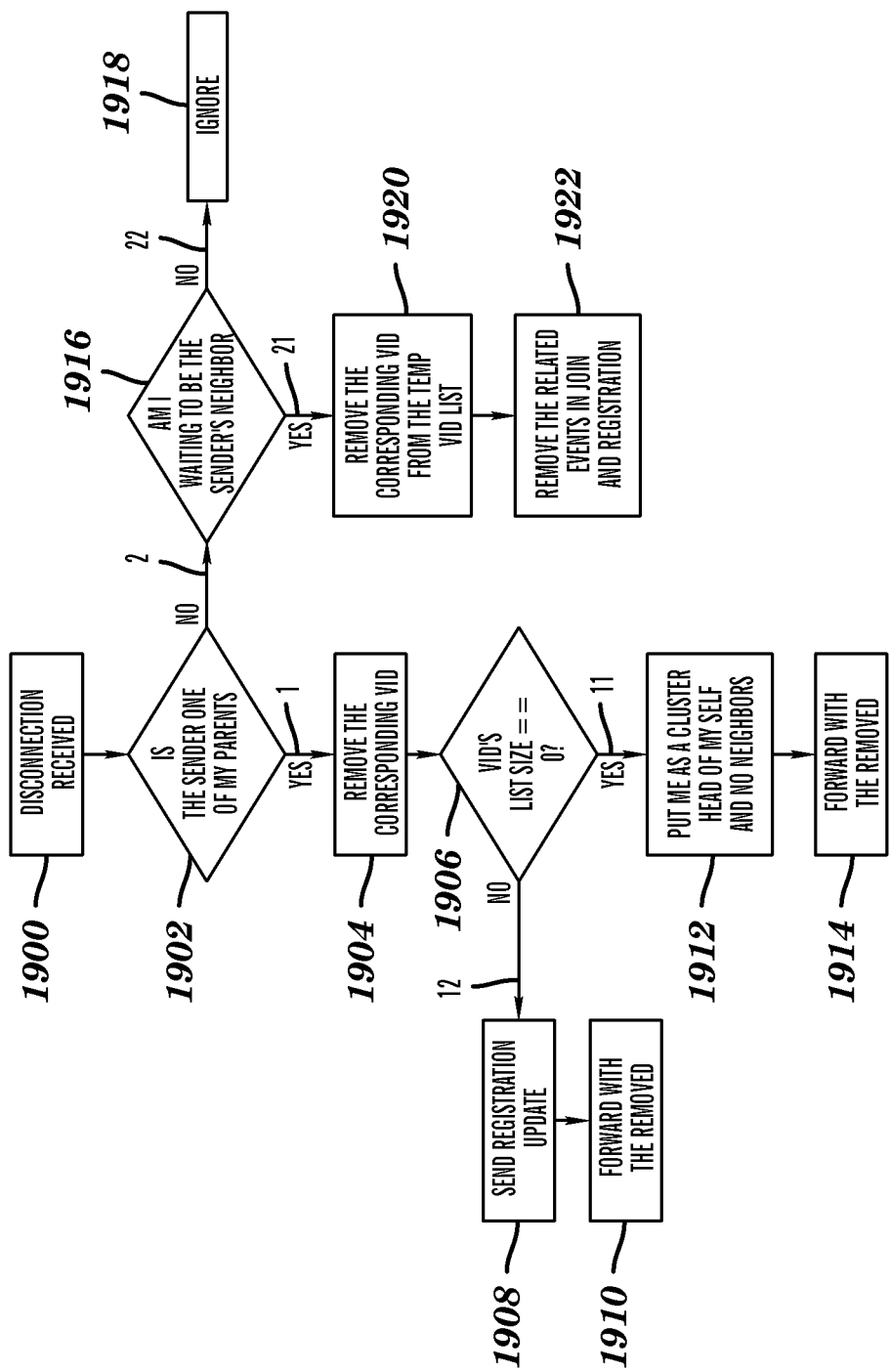
FIG. 19 is a flowchart of an example of a method for disconnecting a mobile communication device from a cluster.

Referring to FIG. 19, a flowchart of an example of a method for disconnecting one of the mobile communication devices 102(1)-102(43) from one of the clusters 104(1)-104(4) is illustrated. In step 1900, one of the mobile communication devices 102(1)-102(43) receives a disconnection message. In step 1902, the receiving one of the mobile communication devices 102(1)-102(43) determines if the sending one of the mobile communication devices 102(1)-102(43) of the disconnection is one of its parents. If in step 1902 the receiving one of the mobile communication devices 102(1)-102(43) determines the sending one of the mobile communication devices 102(1)-102(43) of the disconnection is one of its parents, then the Yes branch is taken to step 1904. In step 1904, the receiving one of the mobile communication devices 102(1)-102(43) removes the corresponding virtual identifier of the sending one of the mobile communication devices 102(1)-102(43) of the disconnection from its neighbor list and is now disconnected from that neighbor.

In step 1906, the receiving one of the mobile communication devices 102(1)-102(43) determines if the size of the list of virtual identifiers equals zero or in other words is empty. If in step 1906 the receiving one of the mobile communication devices 102(1)-102(43) determines the size of the list of virtual identifiers does not equals zero, then the No branch is taken to step 1908. The receiving one of the mobile communication devices 102(1)-102(43) is still part of at least one of the other clusters 104(1)-104(4), so it will notify those other clusters 104(1)-104(4). In step 1908, the receiving one of the mobile communication devices 102(1)-102(43) sends a registration update to the other clusters 104(1)-104(4). In step 1910, the registration update is forwarded with the disconnected virtual identifier removed from the list. If in step 1906 the receiving one of the mobile communication devices 102 (1)-102(43) determines the size of the list of virtual identifiers does equals zero which means it is empty, then the Yes branch is taken to step 1912. In step 1912, the receiving (disconnected) one of the mobile communication devices 102(1)-102(43) puts itself as a cluster head of itself and has no neighbors. In step 1914, the disconnected one of the mobile communication devices 102(1)-102(43) forwards the removed virtual identifier to the one of the mobile communication devices 102(1)-102(43) which was its former parent.

If back in step 1902 the receiving one of the mobile communication devices 102(1)-102(43) determines the sending one of the mobile communication devices 102(1)-102(43) of the disconnection is not one of its parents, then the No branch is taken to step 1916. In step 1916, the receiving one of the mobile communication devices 102(1)-102(43) of a disconnect message determines if it is waiting to be the neighbor of the sending one of the mobile communication devices 102 (1)-102(43). If in step 1916 the receiving one of the mobile communication devices 102(1)-102(43) determines it is not waiting to be the neighbor of the sending one of the mobile communication devices 102(1)-102(43), then the No branch is taken to step 1918. In step 1918, the disconnect message is ignored because no connection was being attempted. If in step 1916 the receiving one of the mobile communication devices 102(1)-102(43) determines it is waiting to be the neighbor of the sending one of the mobile communication devices 102 (1)-102(43), then the Yes branch is taken to step 1920. In step 1920, the receiving one of the mobile communication devices 102(1)-102(43) removes the corresponding virtual identifier from the temporary virtual identifier list. This temporary list was used while the registration acceptance was pending. In step 1922, the receiving one of the mobile communication devices 102(1)-102(43) removes the related events in join and registration, to cancel all pending attempts to join or register, now that it has received a disconnect message.

Accordingly, as illustrated and described herein the present invention provides a number of advantages including providing a proactive system and method for providing a mobile communication network which leverages the advantages of a tree routing structure for easy routing with a mesh network for route robustness. The present invention utilizes a virtual identification system which facilitates easy and dynamic tree creation with very low overhead and loop aversion. This virtual identification system relieves the routing functions at layer 3 in the OSI seven layer model. Relieving these routing functions reduces overheads and delays associated with layer 3 processing and handling and makes the present invention independent of any future IP layer protocol changes, such as in Internet Protocol version 6.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing a mobile communication network, the method comprising:
   dynamically forming by at least one of a plurality of mobile communication devices, the plurality of mobile communication devices into one or more clusters based on one or more parameters, each of the one or more clusters having one of the plurality of mobile communication devices dynamically designated a cluster head and a tree structure branching from the cluster head;
   at least partially meshing by the at least one of the plurality of mobile communication devices each of the one or more clusters together; and
   dynamically assigning by the at least one of the plurality of mobile communication devices one virtual identifier to each mobile communication device designated a cluster head and multiple virtual identifiers to each of the plurality of non-cluster head mobile communication devices based on the tree structure of each of the one or more clusters to provide address information containing all connections for each of the plurality of mobile communication devices for routing communications between two or more of the plurality of mobile communication devices.

2. The method as set forth in claim 1 wherein the one or more parameters for at least one of the one or more of the clusters comprise a maximum available bandwidth, a maximum cluster size, and a maximum number of permitted hops between the plurality of mobile communication devices in the at least one of the one or more of the clusters.

3. The method as set forth in claim 1 further comprising:
   receiving a request from one of the plurality of mobile communication devices to join one of the one or more clusters;
   determining whether the one of the plurality of mobile communication devices can join the one of the one or more clusters based on the one or more parameters; and
   providing an indication on whether the one of the plurality of mobile communication devices can join one of the one or more clusters based on the determination.

4. The method as set forth in claim 3 wherein the determining whether the one of the plurality of mobile communication devices can join further comprises determining if a list of virtual identifiers for the one of the plurality of mobile communication devices is full, wherein the providing an indication on whether the one of the plurality of mobile communication devices can join is further based on the determination of whether the list of virtual identifiers for the one of the plurality of mobile communication devices is full.

5. The method as set forth in claim 4 further comprises determining whether at least one of the virtual identifiers on the list can be replaced with a new virtual identifier based on at least one parameter, wherein the providing an indication on whether the one of the plurality of mobile communication devices can join is further based on the determination of whether at least one of the virtual identifiers on the list can be replaced with a new virtual identifier.

6. The method as set forth in claim 5 wherein the at least one parameter is a number of hops to a cluster head associated with each of the virtual identifiers on the list, wherein the determining determines at least one of the virtual identifiers on the list can be replaced with the new virtual identifier when the new virtual identifier has less hops to the cluster head than at least one of the virtual identifiers on the list.

7. The method as set forth in claim 1 wherein the dynamically assigning a virtual identifier further comprises dynamically assigning a numerical identifier to each of the plurality of mobile communication devices, wherein a first digit of the numerical identifier identifies the one of the plurality of mobile communication devices in each of the one or more clusters which is the cluster head and each subsequent digit of the numerical identifier identifies one or more branches associated with a prior corresponding digit of the numerical identifier.

8. The method as set forth in claim 1 further comprising:
   monitoring with at least one of the one of the plurality of mobile communication devices for an occurrence of at least one event; and
   providing configuration information to at least one of the plurality of mobile communication devices in response to the monitored occurrence of the at least one event.

9. The method as set forth in claim 8 wherein at least one event comprises at least one of a failure of one of the plurality of mobile communication devices, a security breach at one of the plurality of mobile communication devices, and an expiration of a set time period.

10. The method as set forth in claim 8 wherein the providing configuration information further comprises dynamically assigning one or more additional virtual identifiers to one or more of the plurality of mobile communication devices in at least one of the one or more clusters based on an addition of one of the plurality of mobile communication devices to at least one of the one or more clusters.

11. The method as set forth in claim 8 wherein the providing configuration information further comprises dynamically removing one or more of the virtual identifiers from one or more of the plurality of mobile communication devices in at least one of the one or more clusters based on a removal of one of the plurality of mobile communication devices from the at least one of the one or more clusters.

12. The method as set forth in claim 8 wherein the providing configuration information further comprises dynamically assigning one or more of additional virtual identifiers to one or more of the plurality of mobile communication devices in at least one of the one or more clusters based on a new designation of one of the plurality of mobile communication devices as a cluster head in the at least one of the one or more clusters.

13. A non-transitory computer readable medium having stored thereon instructions for a method for providing a mobile communication network comprising machine executable code which when executed by at least one processor, causes the processor to perform steps comprising:
   dynamically forming a plurality of mobile communication devices into one or more clusters based on one or more parameters, each of the one or more clusters having one of the plurality of mobile communication devices dynamically designated a cluster head and a tree structure branching from the cluster head;
   at least partially meshing each of the one or more clusters together; and
   dynamically assigning one virtual identifier to each mobile communication device designated a cluster head and multiple virtual identifiers to each of the plurality of non-cluster head mobile communication devices based on the tree structure of each of the one or more clusters to provide address information containing all connections for each of the plurality of mobile communication devices for routing communications between two or more of the plurality of mobile communication devices.

14. The medium as set forth in claim 13 wherein the one or more parameters for at least one of the one or more of the clusters comprise a maximum available bandwidth, a maximum cluster size, and a maximum number of permitted hops between the plurality of mobile communication devices in the at least one of the one or more of the clusters.

15. The medium as set forth in claim 13 further comprising:
receiving a request from one of the plurality of mobile communication devices to join one of the one or more clusters;
determining whether the one of the plurality of mobile communication devices can join the one of the one or more clusters based on the one or more parameters; and
providing an indication on whether the one of the plurality of mobile communication devices can join one of the one or more clusters based on the determination.

16. The medium as set forth in claim 15 wherein the determining whether the one of the plurality of mobile communication devices can join further comprises determining if a list of virtual identifiers for the one of the plurality of mobile communication devices is full, wherein the providing an indication on whether the one of the plurality of mobile communication devices can join is further based on the determination of whether the list of virtual identifiers for the one of the plurality of mobile communication devices is full.

17. The medium as set forth in claim 16 further comprises determining whether at least one of the virtual identifiers on the list can be replaced with a new virtual identifier based on at least one parameter, wherein the providing an indication on whether the one of the plurality of mobile communication devices can join is further based on the determination of whether at least one of the virtual identifiers on the list can be replaced with a new virtual identifier.

18. The medium as set forth in claim 17 wherein the at least one parameter is a number of hops to a cluster head associated with each of the virtual identifiers on the list, wherein the determining determines at least one of the virtual identifiers on the list can be replaced with the new virtual identifier when the new virtual identifier has less hops to the cluster head than at least one of the virtual identifiers on the list.

19. The medium as set forth in claim 13 wherein the dynamically assigning a virtual identifier further comprises dynamically assigning a numerical identifier to each of the plurality of mobile communication devices, wherein a first digit of the numerical identifier identifies the one of the plurality of mobile communication devices in each of the one or more clusters which is the cluster head and each subsequent digit of the numerical identifier identifies one or more branches associated with a prior corresponding digit of the numerical identifier.

20. The medium as set forth in claim 13 further comprising:
monitoring with at least one of the one of the plurality of mobile communication devices for an occurrence of at least one event; and
providing configuration information to at least one of the plurality of mobile communication devices in response to the monitored occurrence of the at least one event.

21. The medium as set forth in claim 20 wherein at least one event comprises at least one of a failure of one of the plurality of mobile communication devices, a security breach at one of the plurality of mobile communication devices, and an expiration of a set time period.

22. The medium as set forth in claim 20 wherein the providing configuration information further comprises dynamically assigning one or more additional virtual identifiers to one or more of the plurality of mobile communication devices in at least one of the one or more clusters based on an addition of one of the plurality of mobile communication devices to at least one of the one or more clusters.

23. The medium as set forth in claim 20 wherein the providing configuration information further comprises dynamically removing one or more of the virtual identifiers from one or more of the plurality of mobile communication devices in at least one of the one or more clusters based on a removal of one of the plurality of mobile communication devices from the at least one of the one or more clusters.

24. The medium as set forth in claim 20 wherein the providing configuration information further comprises dynamically assigning one or more of additional virtual identifiers to one or more of the plurality of mobile communication devices in at least one of the one or more clusters based on a new designation of one of the plurality of mobile communication devices as a cluster head in the at least one of the one or more clusters.

25. A mobile communication network system comprising:
a tree structure clustering system in at least one of a plurality of mobile communication devices that dynamically forms the plurality of mobile communication devices into one or more clusters based on one or more parameters, each of the one or more clusters having one of the plurality of mobile communication devices dynamically designated a cluster head and a tree structure branching from the cluster head;
a meshing system in the at least one of a plurality of mobile communication devices that at least partially meshes each of the one or more clusters together; and
a virtual identification system in the at least one of a plurality of mobile communication devices that dynamically assigns one virtual identifier to each mobile communication device designated a cluster head and multiple virtual identifiers to each of the plurality of non-cluster head mobile communication devices based on the tree structure of each of the one or more clusters to provide address information containing all connections for each of the plurality of mobile communication devices for routing communications between two or more of the plurality of mobile communication devices.

26. The system as set forth in claim 25 wherein the one or more parameters for at least one of the one or more of the clusters comprise a maximum available bandwidth, a maximum cluster size, and a maximum number of permitted hops between the plurality of mobile communication devices in the at least one of the one or more of the clusters.

27. The system as set forth in claim 25 further comprising a cluster processing system in the at least one of a plurality of mobile communication devices that receives a request from one of the plurality of mobile communication devices to join one of the one or more clusters, determines whether the one of the plurality of mobile communication devices can join the one of the one or more clusters based on the one or more parameters and provides an indication on whether the one of the plurality of mobile communication devices can join one of the one or more clusters based on the determination.

28. The system as set forth in claim 27 wherein the cluster processing system in the at least one of a plurality of mobile communication devices determines if a list of virtual identifiers for the one of the plurality of mobile communication devices is full, wherein the cluster processing system in the at least one of a plurality of mobile communication devices provides an indication on whether the one of the plurality of mobile communication devices can join further based on the determination of whether the list of virtual identifiers for the one of the plurality of mobile communication devices is full.

29. The system as set forth in claim 28 wherein the cluster processing system in the at least one of a plurality of mobile communication devices further determines whether at least one of the virtual identifiers on the list can be replaced with a new virtual identifier based on at least one parameter, wherein the cluster processing system in the at least one of a plurality of mobile communication devices provides an indication on whether the one of the plurality of mobile communication devices can join is further based on the determination of whether at least one of the virtual identifiers on the list can be replaced with a new virtual identifier.

30. The system as set forth in claim 29 wherein the at least one parameter is a number of hops to a cluster head associated with each of the virtual identifiers on the list, wherein the cluster processing system in the at least one of a plurality of mobile communication devices determines at least one of the virtual identifiers on the list can be replaced with the new virtual identifier when the new virtual identifier has less hops to the cluster head than at least one of the virtual identifiers on the list.

31. The system as set forth in claim 25 wherein the virtual identification system in the at least one of a plurality of mobile communication devices dynamically assigns a numerical identifier to each of the plurality of mobile communication devices, wherein a first digit of the numerical identifier identifies the one of the plurality of mobile communication devices in each of the one or more clusters which is the cluster head and each subsequent digit of the numerical identifier identifies one or more branches associated with a prior corresponding digit of the numerical identifier.

32. The system as set forth in claim 25 further comprising a cluster processing system in the at least one of a plurality of mobile communication devices that dynamically designates one of the plurality of mobile communication devices in each of the one or more clusters as a cluster head.

33. The system as set forth in claim 25 wherein the cluster processing system in the at least one of a plurality of mobile communication devices monitors for an occurrence of at least one event and providing configuration information to at least one of the plurality of mobile communication devices in response to the monitored occurrence of the at least one event.

34. The system as set forth in claim 33 wherein at least one event comprises at least one of a failure of one of the plurality of mobile communication devices, a security breach at one of the plurality of mobile communication devices, and an expiration of a set time period.

35. The system as set forth in claim 33 wherein the virtual identification system in the at least one of a plurality of mobile communication devices dynamically assigns one or more additional virtual identifiers to one or more of the plurality of mobile communication devices in at least one of the one or more clusters based on an addition of one of the plurality of mobile communication devices to at least one of the one or more clusters.

36. The system as set forth in claim 33 wherein the virtual identification system in the at least one of a plurality of mobile communication devices dynamically removes one or more of the virtual identifiers from one or more of the plurality of mobile communication devices in at least one of the one or more clusters based on a removal of one of the plurality of mobile communication devices from the at least one of the one or more clusters.

37. The system as set forth in claim 33 wherein the virtual identification system in the at least one of a plurality of mobile communication devices dynamically assigns one or more of additional virtual identifiers to one or more of the plurality of mobile communication devices in at least one of the one or more clusters based on a new designation of one of the plurality of mobile communication devices as a cluster head in the at least one of the one or more clusters.

38. At least one of a plurality of mobile communication devices comprising a memory coupled to one or more processors which are configured to execute programmed instructions stored in the memory comprising:
dynamically forming a plurality of mobile communication devices into one or more clusters based on one or more parameters, each of the one or more clusters having one of the plurality of mobile communication devices dynamically designated a cluster head and a tree structure branching from the cluster head;
at least partially meshing each of the one or more clusters together; and
dynamically assigning one virtual identifier to each mobile communication device designated a cluster head and multiple virtual identifiers to each of the plurality of non-cluster head mobile communication devices based on the tree structure of each of the one or more clusters to provide address information containing all connections for each of the plurality of mobile communication devices for routing communications between two or more of the plurality of mobile communication devices.

39. The device as set forth in claim 38 wherein the one or more parameters for at least one of the one or more of the clusters comprise a maximum available bandwidth, a maximum cluster size, and a maximum number of permitted hops between the plurality of mobile communication devices in the at least one of the one or more of the clusters.

40. The device as set forth in claim 38 wherein the one or more processors is further configured to execute programmed instructions stored in the memory further comprising:
receiving a request from one of the plurality of mobile communication devices to join one of the one or more clusters;
determining whether the one of the plurality of mobile communication devices can join the one of the one or more clusters based on the one or more parameters; and
providing an indication on whether the one of the plurality of mobile communication devices can join one of the one or more clusters based on the determination.

41. The device as set forth in claim 40 wherein the one or more processors is further configured to execute programmed instructions stored in the memory for the determining whether the one of the plurality of mobile communication devices can join further comprises determining if a list of virtual identifiers for the one of the plurality of mobile communication devices is full, wherein the providing an indication on whether the one of the plurality of mobile communication devices can join is further based on the determination of whether the list of virtual identifiers for the one of the plurality of mobile communication devices is full.

42. The device as set forth in claim 41 wherein the one or more processors is further configured to execute programmed instructions stored in the memory further comprising determining whether at least one of the virtual identifiers on the list can be replaced with a new virtual identifier based on at least one parameter, wherein the providing an indication on whether the one of the plurality of mobile communication devices can join is further based on the determination of whether at least one of the virtual identifiers on the list can be replaced with a new virtual identifier.

43. The device as set forth in claim 42 wherein the at least one parameter is a number of hops to a cluster head associated with each of the virtual identifiers on the list, wherein the determining determines at least one of the virtual identifiers on the list can be replaced with the new virtual identifier when the new virtual identifier has less hops to the cluster head than at least one of the virtual identifiers on the list.

44. The device as set forth in claim 38 wherein the one or more processors is further configured to execute programmed instructions stored in the memory for the dynamically assigning a virtual identifier further comprises dynamically assigning a numerical identifier to each of the plurality of mobile communication devices, wherein a first digit of the numerical identifier identifies the one of the plurality of mobile communication devices in each of the one or more clusters which is the cluster head and each subsequent digit of the numerical identifier identifies one or more branches associated with a prior corresponding digit of the numerical identifier.

45. The device as set forth in claim 38 wherein the one or more processors is further configured to execute programmed instructions stored in the memory further comprising dynamically designating one of the plurality of mobile communication devices in each of the one or more clusters as a cluster head.

46. The device as set forth in claim 38 wherein the one or more processors is further configured to execute programmed instructions stored in the memory further comprising:
    monitoring with at least one of the one of the plurality of mobile communication devices for an occurrence of at least one event; and
    providing configuration information to at least one of the plurality of mobile communication devices in response to the monitored occurrence of the at least one event.

47. The device as set forth in claim 46 wherein at least one event comprises at least one of a failure of one of the plurality of mobile communication devices, a security breach at one of the plurality of mobile communication devices, and an expiration of a set time period.

48. The device as set forth in claim 46 wherein the one or more processors is further configured to execute programmed instructions stored in the memory for the providing configuration information further comprises dynamically assigning one or more additional virtual identifiers to one or more of the plurality of mobile communication devices in at least one of the one or more clusters based on an addition of one of the plurality of mobile communication devices to at least one of the one or more clusters.

49. The device as set forth in claim 46 wherein the one or more processors is further configured to execute programmed instructions stored in the memory for the providing configuration information further comprises dynamically removing one or more of the virtual identifiers from one or more of the plurality of mobile communication devices in at least one of the one or more clusters based on a removal of one of the plurality of mobile communication devices from the at least one of the one or more clusters.

50. The device as set forth in claim 46 wherein the one or more processors is further configured to execute programmed instructions stored in the memory for the providing configuration information further comprises dynamically assigning one or more of additional virtual identifiers to one or more of the plurality of mobile communication devices in at least one of the one or more clusters based on a new designation of one of the plurality of mobile communication devices as a cluster head in the at least one of the one or more clusters.

* * * * *